United States Patent
Guo et al.

(10) Patent No.: US 12,167,385 B2
(45) Date of Patent: Dec. 10, 2024

(54) USER PAIRING METHOD AND RELATED DEVICE

(71) Applicant: Huawei Technologies Co., Ltd., Shenzhen (CN)

(72) Inventors: Senbao Guo, Xi'an (CN); Chunhui Le, Shanghai (CN); Weihua Wang, Shanghai (CN); Ning Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 579 days.

(21) Appl. No.: 17/484,855

(22) Filed: Sep. 24, 2021

(65) Prior Publication Data

US 2022/0015111 A1   Jan. 13, 2022

Related U.S. Application Data

(63) Continuation of application No. PCT/CN2020/081753, filed on Mar. 27, 2020.

(30) Foreign Application Priority Data

Mar. 27, 2019   (CN) .................... 201910240533.X

(51) Int. Cl.
*H04W 72/121* (2023.01)
*H04B 7/0413* (2017.01)
(Continued)

(52) U.S. Cl.
CPC ......... *H04W 72/121* (2013.01); *H04L 5/0048* (2013.01); *H04L 27/2607* (2013.01);
(Continued)

(58) Field of Classification Search
CPC ............... H04B 7/0413; H04L 5/0048; H04L 27/2607; H04W 72/121; H04W 72/1268; H04W 72/543; H04W 76/14
See application file for complete search history.

(56) References Cited

U.S. PATENT DOCUMENTS

| 2011/0044272 A1 | 2/2011 | Cui et al. |
| 2012/0163318 A1 | 6/2012 | Kishiyama et al. |

(Continued)

FOREIGN PATENT DOCUMENTS

| CN | 1618247 A | 5/2005 |
| CN | 101267664 A | 9/2008 |

(Continued)

OTHER PUBLICATIONS

Toshiba Corporation, "On UL Reference Signal Structure," 3GPP TSG RAN WG1 #47bis, Sorento, Italy, R1-070492, total 3 pages, 3rd Generation Partnership Project, Valbonne, France (Jan. 15-19, 2007).

*Primary Examiner* — Brian P Cox
(74) *Attorney, Agent, or Firm* — Leydig, Voit & Mayer, Ltd.

(57) ABSTRACT

Embodiments of this application disclose a user pairing method and a related device. The method includes: determining a first generation parameter of a first base sequence of a first user and a second generation parameter of a second base sequence of a second user, and the second base sequence is used to generate a second uplink reference signal of the second user; determining multiplexing evaluation information based on the first generation parameter and the second generation parameter, where the multiplexing evaluation information may include correlation strength between sequences and interference leakage width; determining, based on the multiplexing evaluation information, whether the first user and the second user are successfully (Continued)

paired; and determining, that the first user and the second user multiplex a same communication resource for communication based on being successfully paired.

18 Claims, 10 Drawing Sheets

(51) Int. Cl.
*H04L 5/00* (2006.01)
*H04L 27/26* (2006.01)
*H04W 72/1268* (2023.01)
*H04W 72/543* (2023.01)
*H04W 76/14* (2018.01)

(52) U.S. Cl.
CPC ..... *H04W 72/1268* (2013.01); *H04W 72/543* (2023.01); *H04W 76/14* (2018.02); *H04B 7/0413* (2013.01)

(56) References Cited

U.S. PATENT DOCUMENTS

| 2014/0003474 A1 | 1/2014 | Xin et al. |
| 2018/0063856 A1 | 3/2018 | Yang et al. |
| 2019/0044775 A1* | 2/2019 | Zhang ................. H04L 27/2613 |
| 2019/0158170 A1* | 5/2019 | Seo ...................... H04J 11/0026 |

FOREIGN PATENT DOCUMENTS

| CN | 102420645 A | | 4/2012 | |
| CN | 102438322 A | | 5/2012 | |
| CN | 103731923 A | | 4/2014 | |
| CN | 103974418 A | | 8/2014 | |
| CN | 107276734 A | * | 10/2017 | ......... H04L 27/2607 |
| CN | 109039407 A | | 12/2018 | |
| WO | 2016188147 A1 | | 12/2016 | |
| WO | 2018036305 A1 | | 3/2018 | |

\* cited by examiner

USER PAIRING METHOD AND RELATED DEVICE

CROSS-REFERENCE TO RELATED APPLICATIONS

This application is a continuation of International Application No. PCT/CN2020/081753, filed on Mar. 27, 2020, which claims priority to Chinese Patent Application No. 201910240533.X, filed on Mar. 27, 2019. The disclosures of the aforementioned applications are hereby incorporated by reference in their entireties.

TECHNICAL FIELD

This application relates to the field of wireless communications technologies, and in particular, to a user pairing method and a related device.

BACKGROUND

In an uplink communication scenario of a massive multiple-input multiple-output system (Massive MIMO) of time division duplex (TDD), to improve uplink spectral efficiency, in the current technology, at least two users from a plurality of users are first selected for pairing, and then the paired users are jointly scheduled to multiplex a same frequency domain resource for uplink transmission. Commonly used user pairing algorithms include a proportional fairness algorithm, a determinant algorithm, an orthogonal matching algorithm, and the like. However, when sizes of resource blocks occupied by the paired users are different, interference exists between uplink reference signals of the paired users. Consequently, a base station cannot distinguish between uplink channels of the paired users, and a spectral efficiency is low.

SUMMARY

Embodiments of this application provide a user pairing method and a related device, to improve flexibility of user pairing and spectral efficiency.

According to a first aspect, an embodiment of this application provides a user pairing method, including: determining a first generation parameter of a first base sequence of a first user and a second generation parameter of a second base sequence of a second user, where the first base sequence is used to generate a first uplink reference signal of the first user, and the second base sequence is used to generate a second uplink reference signal of the second user; determining multiplexing evaluation information of the first base sequence and the second base sequence based on the first generation parameter and the second generation parameter, where the multiplexing evaluation information includes at least one of correlation strength between the first base sequence and the second base sequence, and interference leakage information between a first power delay profile of a channel response corresponding to the first uplink reference signal and a second power delay profile of a channel response corresponding to the second uplink reference signal; determining, based on the multiplexing evaluation information, whether the first user and the second user are successfully paired; and determining, when the first user and the second user are successfully paired, that the first user and the second user multiplex a same communication resource for communication. Whether a large-packet user and a small-packet user can be paired is determined based on correlation strength of base sequences and interference leakage information between power delay profiles, thereby breaking through a limitation of aligned pairing, and improving flexibility of pairing between the large-packet user and the small-packet user.

In another possible design, when the correlation strength is greater than a first preset threshold, it may be determined that the first user and the second user are successfully paired.

In another possible design, after it is determined that the first user and the second user are successfully paired, an offset of a start location of a resource block occupied by the first user relative to a start location of a resource block occupied by the second user may be first determined, and then the first uplink reference signal is generated based on the offset and the first base sequence, where the first uplink reference signal is used to estimate an uplink channel of the first user when the first user and the second user multiplex the same communication resource for communication. Uplink reference signals of paired users are preferentially selected based on an offset, so that accuracy of estimating an uplink channel can be improved, thereby further improving spectral efficiency implemented by jointly scheduling the paired users.

In another possible design, when the offset is zero, a cyclic shift may be performed on the first base sequence based on a preset standard cyclic shift value to obtain the first uplink reference signal.

In another possible design, when the offset is not zero, a cyclic shift compensation value corresponding to the offset may be first determined, and then a cyclic shift is performed on the first base sequence based on a preset standard cyclic shift value and the cyclic shift compensation value to obtain the first uplink reference signal.

In another possible design, a basis kernel coefficient between the first base sequence and the second base sequence may be first determined based on the first generation parameter and the second generation parameter, where the basis kernel coefficient is in a negative correlation to the correlation strength; and then, when the basis kernel coefficient is less than a second preset threshold, it is determined that the first user and the second user are successfully paired. Because calculation complexity of the basis kernel coefficient is relatively low relative to that of the correlation strength, performing pairing on the users based on the basis kernel coefficient can improve user pairing efficiency.

In another possible design, the interference leakage information may include an interference leakage width between the second power delay profile and the first power delay profile; therefore, a quantity of first user multiplexing layers corresponding to the first user, a quantity of second user multiplexing layers corresponding to the second user, and a multipath delay guard interval of a communications system in which the first user and the second user are located may be obtained, an interference leakage threshold between the first user and the second user is determined based on the quantity of first user multiplexing layers, the quantity of second user multiplexing layers, and the multipath delay guard interval, and, when the interference leakage width is not greater than the interference leakage threshold, it is determined that the first user and the second user are successfully paired.

In another possible design, after it is determined that the first user and the second user are successfully paired, a cyclic shift guard interval between the first base sequence and the second base sequence may be first determined; a first cyclic shift value of the second base sequence is determined based on the quantity of second user multiplexing layers and the cyclic shift guard interval; and, a cyclic shift is performed on the second base sequence based on the first cyclic shift value to obtain the second uplink reference signal, where the second uplink reference signal is used to estimate an uplink channel of the second user when the first user and the second user multiplex the same communication resource for communication.

In another possible design, M first candidate cyclic shift values may be determined based on the quantity of second user multiplexing layers; M candidate central locations of the second power delay profile that correspond to the M first candidate cyclic shift values are determined based on the cyclic shift guard interval; and a candidate central location closest to a target location in the M candidate central locations is used as a target central location, and a first candidate cyclic shift value corresponding to the target central location is used as the first cyclic shift value. The cyclic shift value of the second base sequence is preferentially selected, so that a time domain location corresponding to an invalid cyclic shift value can be fully used.

In another possible design, N candidate start locations of the first power delay profile that correspond to N second candidate cyclic shift values in a preset cyclic shift value set may be determined; a second candidate cyclic shift value corresponding to a candidate start location furthest from the target central location in the N candidate start locations is used as a second cyclic shift value; and a cyclic shift is performed on the first base sequence based on the second cyclic shift value, to obtain the first uplink reference signal. The cyclic shift value of the first base sequence is preferentially selected, so that the preferred first uplink reference signal may be obtained, and the first power delay profile and the second power delay profile are separated to the greatest extent, thereby reducing mutual interference between the first power delay profile and the second power delay profile.

In another possible design, a cyclic shift value of a base sequence of another user that performs aligned pairing with the second user may be determined based on the first cyclic shift value, and a cyclic shift value of a base sequence of another user that performs aligned pairing with the first user may be determined based on the second cyclic shift value.

In another possible design, the first generation parameter includes a size of a resource block occupied by the first user. When the interference leakage width is greater than the interference leakage threshold, it is determined that pairing between the first user and the second user fails; or when the interference leakage width is greater than the interference leakage threshold, the size of the resource block is adjusted; and whether the first user and the second user are successfully paired is determined based on the adjusted size of the resource block. The interference leakage width is adjusted by properly adjusting the size of the resource block occupied by the first user, so as to improve a success rate of user pairing.

In another possible design, if it is determined, based on the adjusted size of the resource block, that the first user and the second user are successfully paired, the resource block occupied by the first user may be stretched based on the adjusted size of the resource block.

According to a second aspect, an embodiment of this application provides a user pairing apparatus. The user pairing apparatus is configured to implement the method and functions that are performed by the user pairing apparatus in the first aspect. The user pairing apparatus is implemented by using hardware/software, and the hardware/software thereof includes units corresponding to the foregoing functions.

According to a third aspect, an embodiment of this application provides a user pairing device, including a processor, a memory, and a communications bus. The communications bus is configured to implement connection communication between the processor and the memory, and the processor executes a program stored in the memory, to implement steps in the user pairing method provided in the first aspect.

In a possible design, the user pairing device provided in this embodiment of this application may include a corresponding module configured to perform behavior of user equipment in the foregoing method design. The module may be software and/or hardware.

According to a fourth aspect, an embodiment of this application provides a computer-readable storage medium, where the computer-readable storage medium stores instructions, and when the instructions are run on a computer, the computer is enabled to perform the method in the foregoing aspects.

According to a fifth aspect, an embodiment of this application provides a computer program product including instructions, and when the instructions are run on a computer, the computer is enabled to perform the method in the foregoing aspects.

BRIEF DESCRIPTION OF DRAWINGS

To describe technical solutions in embodiments of this application or in the background more clearly, the following describes the accompanying drawings used in descriptions of the embodiments of this application or the background.

DESCRIPTION OF EMBODIMENTS

The following describes the embodiments of this application with reference to accompanying drawings in the embodiments of this application.

Figure 1:
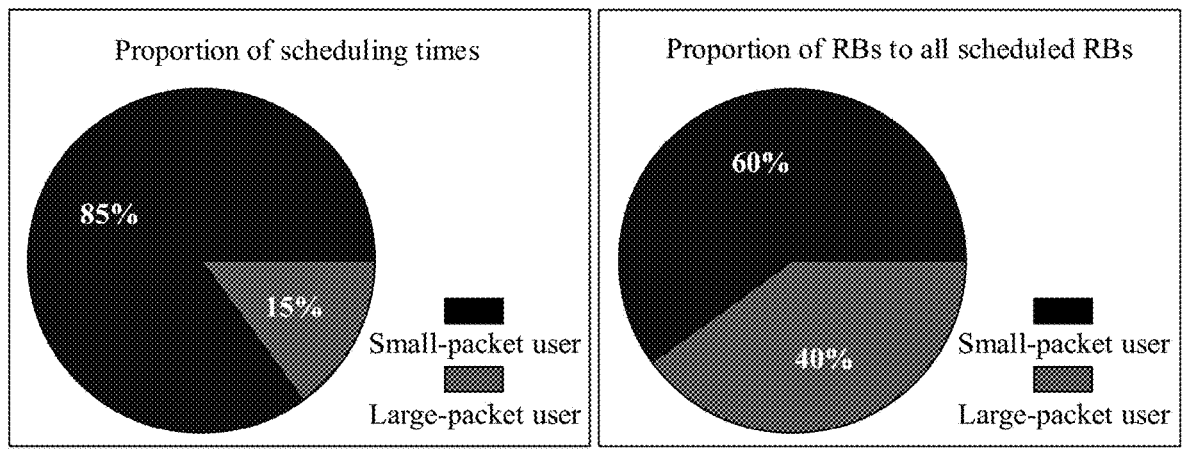
FIG. 1 is a schematic diagram of a large/small-packet user scheduling proportion according to an embodiment of this application.
Figure 2:
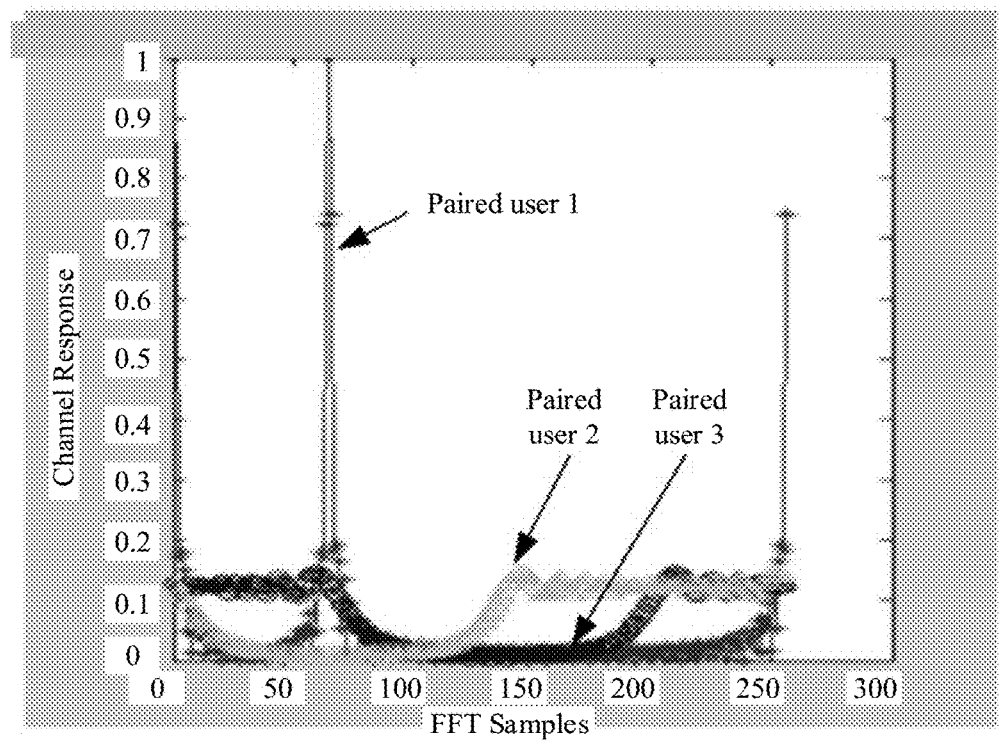
FIG. 2 is a schematic diagram of PDP profile interference between paired users according to an embodiment of this application.

It should be noted that, in an uplink communication scenario of a TDD massive MIMO system, to improve uplink spectral efficiency, the following manner is usually used: at least two users from a plurality of users are selected for pairing, and the paired users are jointly scheduled to multiplex a same frequency domain resource for uplink transmission. In addition, as shown in FIG. 1, service features of an actual commercial scenario of TDD massive MIMO are as follows: a majority of users are small-packet users, a quantity of times that the small-packet users are scheduled is much more than that of large-packet users, and total communication resources occupied by all the small-packet users is about 60% of available communication resources. The small-packet user may be a user that occupies resource blocks (RBs) not greater than 6 RBs, and the large-packet user may be a user that occupies resource blocks greater than 6 RBs. In view of the preceding service features, performing pairing on large-packet users and small-packet users is an important means to optimize a user-perceived rate and spectral efficiency of the system. However, if paired large-packet user and small-packet user are still determined based on an existing pairing algorithm, as shown in FIG. 2, because sizes of resource blocks occupied by the small-packet user and the large-packet user are different, uplink reference signals of the small-packet user and the large-packet user are not orthogonal, and consequently, power delay profiles (PDP) of channel time domain impulse responses corresponding to the uplink reference signals of the paired users that are received by a base station interfere with each other. Further, because the base station needs to separately estimate uplink channels of the paired users based on the PDP profiles of the channel time domain impulse responses, when the PDP profiles of the paired users overlap, the base station cannot accurately estimate the channels, and therefore cannot accurately detect that a user sends a useful signal. Therefore, the large-packet user and the small-packet user cannot be flexibly paired due to a limitation of aligned pairing. The limitation of aligned pairing means that sizes of resource blocks occupied by paired users need to be the same.

Figure 3:
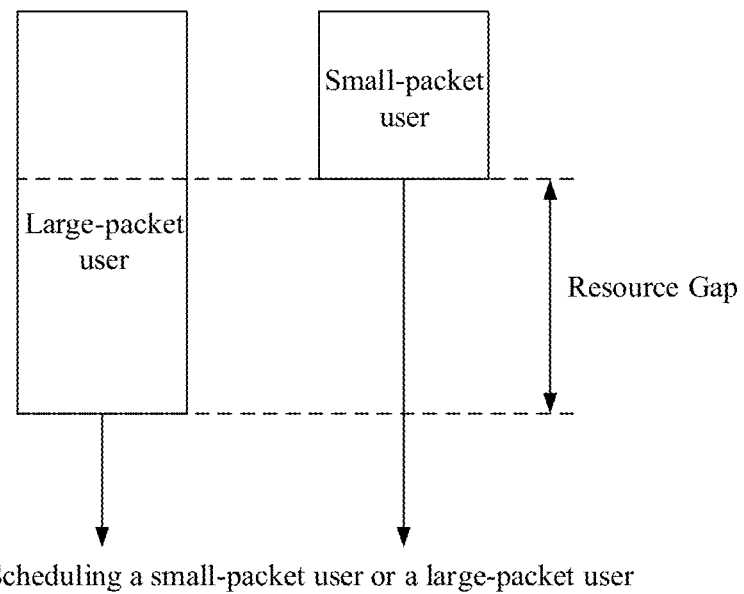
FIG. 3 is a schematic diagram of a user-limited scheduling method according to the current technology.
Figure 4:
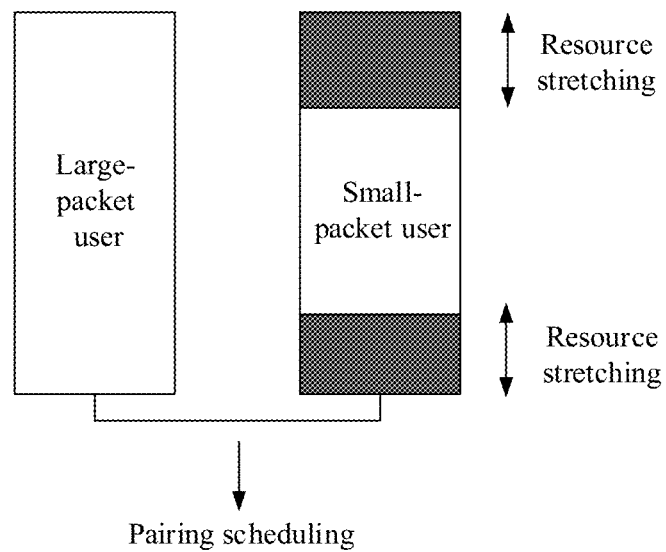
FIG. 4 is a schematic diagram of resource stretching according to the current technology.

In the current technology, response methods proposed for the limitation of aligned pairing include the following methods. (1) limited scheduling method: as shown in FIG. 3, when there is a relatively large difference between quantities of resources occupied by paired large-packet user and small-packet user, transmission of only the large-packet user or the small-packet user is limited. Obviously, the limited scheduling method may lead to a fact that the large-packet user or the small-packet user cannot be scheduled for a long time, thereby deteriorating a user-perceived capability of the system and enabling user experience to be poor. (2) Resource stretching method: as shown in FIG. 4, when there is a relatively small difference between quantities of resources occupied by paired large-packet user and small-packet user, a resource occupied by the small-packet user is first stretched, so that a size of the resource occupied by the small-packet user is equal to that of a resource block occupied by the large-packet user. Although the resource stretching method avoids the limitation of aligned pairing, but a problem of resource waste that cannot be ignored is caused.

Figure 5:
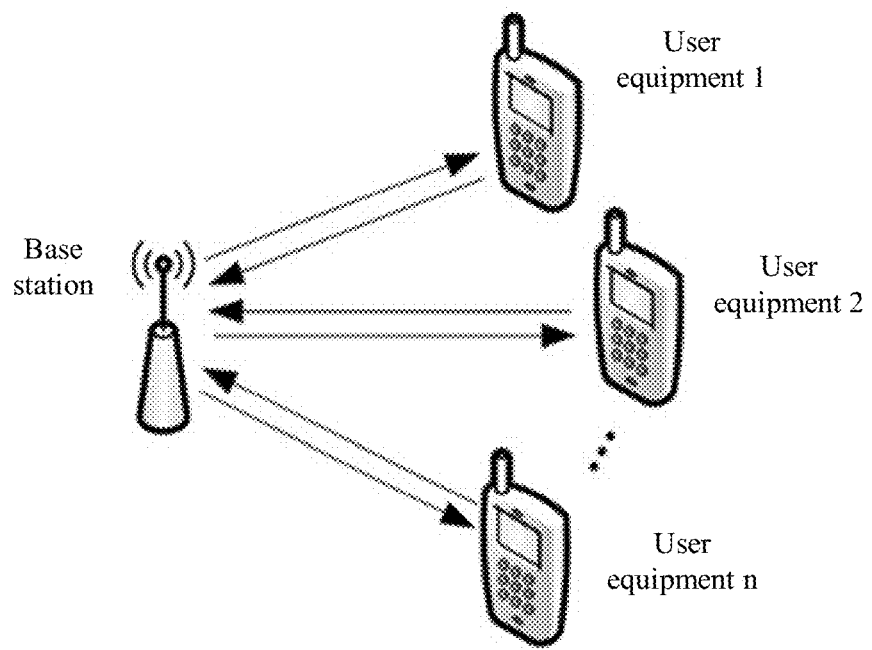
FIG. 5 is a schematic diagram of a TDD massive MIMO system according to an embodiment of this application.

FIG. 5 is a schematic structural diagram of a TDD massive MIMO system according to an embodiment of this application. The system includes one base station and a plurality of user equipment. The base station may be a device configured to communicate with user equipment, and may be an access point, a relay node, a base transceiver station (BTS), a NodeB (NB), an evolved NodeB (eNB), or a 5G base station (next generation node B, gNB). The base station is a device in an access network that communicates with a wireless terminal over an air interface by using one or more sectors. By converting a received air interface frames into an IP packet, the base station may further serve as a router between the wireless terminal and a remaining portion of the access network. The access network may include an Internet Protocol network. The user equipment (UE) may be a device that provides voice and/or a data connection to a user, or may be connected to a computing device such as a laptop computer or a desktop computer, or the user equipment may be a stand-alone device such as a personal digital assistant (PDA). The user equipment may also be referred to as a system, a subscriber unit, a subscriber station, a mobile station, a mobile console, a remote station, an access point, a remote terminal, an access terminal, a user terminal, a user agent, or a user apparatus. Based on the foregoing system, the embodiments of this application provide the following solutions, including: obtaining a first generation parameter of a first base sequence of a first user and a second generation parameter of a second base sequence of a second user, where the first base sequence is used to generate a first uplink reference signal of the first user, and the second base sequence is used to generate a second uplink reference signal of the second user; determining multiplexing evaluation information of the first base sequence and the second base sequence based on the first generation parameter and the second generation parameter; determining, based on the multiplexing evaluation information, whether the first user and the second user are successfully paired, and, after the first user and the second user are successfully paired, determining that the first user and the second user multiplex a same communication resource for communication. The following performs description by using specific embodiments.

Figure 6:
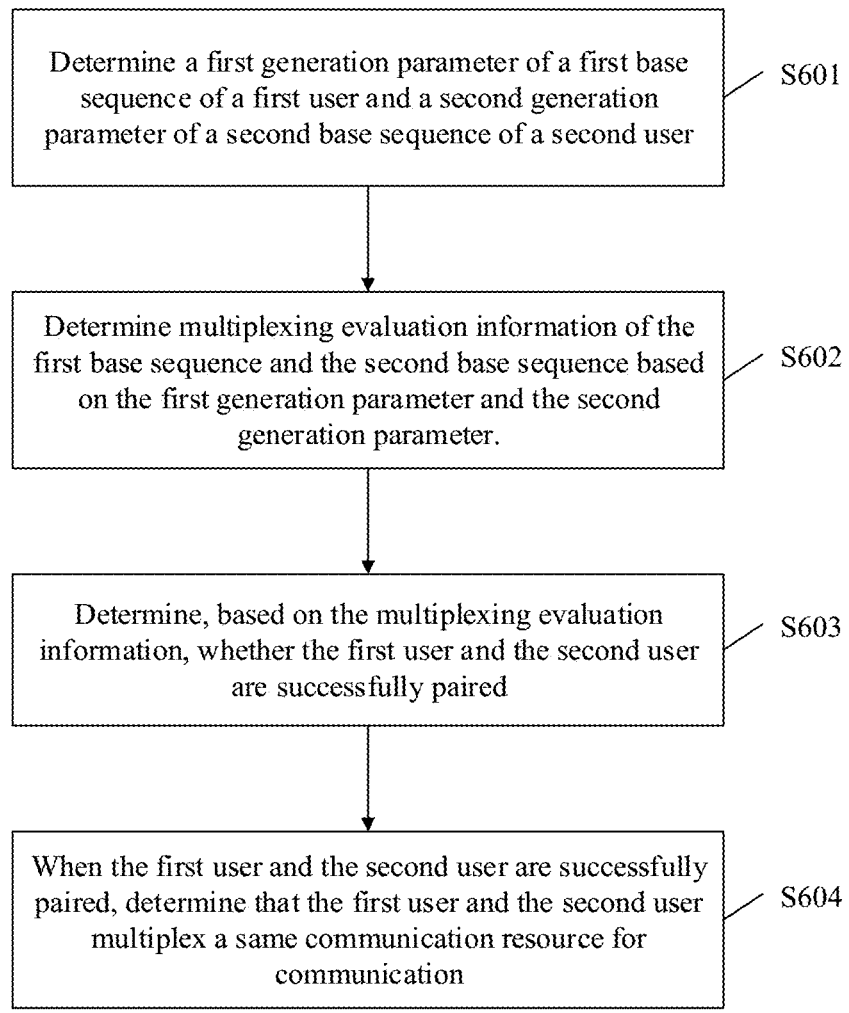
FIG. 6 is a schematic flowchart of a user pairing method according to an embodiment of this application.

FIG. 6 is a schematic flowchart of a user pairing method according to an embodiment of this application. The method includes, but is not limited to, the following steps.

S601. Determine a first generation parameter of a first base sequence of a first user and a second generation parameter of a second base sequence of a second user. The first user may be a small-packet user, and the second user may be a large-packet user. Certainly, the first user may also be a large-packet user, and the second user may also be a small-packet user. In this embodiment of this application, description is performed in a manner in which the first user is used as a small-packet user and the second user is used as a large-packet user. A case in which the first user is a large-packet user and the second user is a small-packet user is similar.

In a specific implementation, the first base sequence is used to generate a first uplink reference signal of the first user, and the second base sequence is used to generate a second uplink reference signal of the second user. The uplink reference signal may include, but is not limited to, a demodulation reference signal (DMRS). The first base sequence may be denoted as $r_{u,v,m}(k)$. According to a 3GPP-LTE physical layer resource mapping protocol, it can be learned that:

$$r_{u,v,m}(k) = x_{q,m}(k \% N_{ZC,m}^{RS}), \ 0 \le k < M_{sc,m}^{RS}, \qquad (1)$$

where:

$$x_{q,m}(k) = e^{-j\frac{\pi q_m k(k+1)}{N_{ZC,m}^{RS}}}, \ 0 \le k \le N_{ZC,m}^{RS} - 1, \qquad (2)$$

$$q_m = \lfloor \bar{q}_m + 1/2 \rfloor + v*(-1)^{\lfloor 2\bar{q}_m \rfloor}, \qquad (3)$$

$$\bar{q}_m = N_{ZC,m}^{RS} *(u+1)/31, \text{ and} \qquad (4)$$

$$N_{ZC,m}^{RS} = argmaxPrime(M_{sc,m}^{RS}), \qquad (5)$$

where u and v are indexes of the base sequence, and specific values of u and v are related to an ID of a cellular cell in which the first user is located. $M_{sc,m}^{RS}$ is a quantity of subcarriers of the first user. In an LTE system, 1 RB is equivalent to 12 consecutive carriers in frequency domain. Therefore, if the first user occupies a resource block with a size of n RBs, $M_{sc,m}^{RS}=n\times12$. Here, k is a sequence number of a subcarrier, % is a modulo operator, argmaxPrime(X) indicates that a maximum prime number that does not exceed X is calculated, and $\lfloor \ \rfloor$ is a round-down operator.

Based on the preceding discussion, the first generation parameter of the first base sequence of the first user may include u, v, $q_m$, $M_{sc,m}^{RS}$, and $N_{ZC,m}^{RS}$. Similarly, the second base sequence may be denoted as $r_{u,v,n}(k)$, and the second base sequence $r_{u,v,n}(k)$ is specifically shown in formulas (6) to (10). Therefore, the second generation parameter may include u', v', $q_n$, $M_{sc,n}^{RS}$ and $N_{ZC,n}^{RS}$. If the first user and the second user are located in a same cellular cell, u' may be set to be the same as u.

$$r_{u,v,n}(k) = x_{q,n}(k \% N_{ZC,n}^{RS}), \ 0 \le k < M_{sc,n}^{RS}, \qquad (6)$$

$$x_{q,n}(k) = e^{-j\frac{\pi q_n k(k+1)}{N_{ZC,n}^{RS}}}, \ 0 \le k \le N_{ZC,n}^{RS} - 1, \qquad (7)$$

$$q_n = \lfloor \bar{q}_n + 1/2 \rfloor + v^*(-1)^{\lfloor 2\bar{q}_n \rfloor}, \qquad (8)$$

$$\bar{q}_n = N_{ZC,n}^{RS} *(u+1)/31, \qquad (9)$$

$$N_{ZC,n}^{RS} = argmaxPrime(M_{sc,n}^{RS}) \qquad (10)$$

S602. Determine multiplexing evaluation information of the first base sequence and the second base sequence based on the first generation parameter and the second generation parameter.

In a specific implementation, each sequence element in the first base sequence $r_{u,v,m}(k)$ and the second base sequence $r_{u,v,n}(k)$ may be separately calculated according to formula (1) and formula (6) based on the first generation parameter and the second generation parameter, and then correlation strength $R_{m,n}$ between the first base sequence $r_{u,v,m}(k)$ and $r_{u,v,n}(k)$ is calculated based on the sequence element, and the correlation strength $R_{m,n}$ is used as the multiplexing evaluation information. A calculation method of $R_{m,n}$ is shown in formula (11).

$$R_{m,n} = \sum_{k=0}^{k=M_{sc,m}^{RS}-1} r_{u,v,m}(k) * r_{u,v,n}(k)^* \qquad (11)$$

-continued $$= \sum_{k=0}^{k=M_{sc,m}^{RS}-1} e^{-j\frac{\pi q_m k(k+1)}{N_{ZC,m}^{RS}}} * e^{j\frac{\pi q_n k(k+1)}{N_{ZC,n}^{RS}}}$$

Here, $r_{u,v,n}(k)^*$ represents a conjugate transpose of $r_{u,v,n}(k)$. $M_{sc,m}^{RS}$ is not equal to $M_{sc,n}^{RS}$, so that only correlation strength of overlapping parts between $r_{u,v,m}(k)$ and $r_{u,v,n}(k)$ needs to be calculated.

Optionally, a further operation may be performed on formula (11) to obtain:

$$R_{m,n} = \sum_{k=0}^{k=M_{sc,m}^{RS}-1} e^{-j\frac{\pi q_m k(k+1)}{N_{ZC,m}^{RS}}} * e^{j\frac{\pi q_n k(k+1)}{N_{ZC,n}^{RS}}}, \qquad (12)$$

where $$\frac{q_m}{N_{ZC,m}^{RS}} - \frac{q_n}{N_{ZC,n}^{RS}}$$

may be referred to as a basis kernel coefficient between the first base sequence and the second base sequence. It can be learned from formula (12) that, $R_{m,n}$ is in a negative correlation to $$\frac{q_m}{N_{ZC,m}^{RS}} - \frac{q_n}{N_{ZC,n}^{RS}},$$

so that the correlation strength between the sequences may be evaluated based on the basis kernel coefficient.

It should be noted that, in an existing aligned pairing method, assuming that a base sequence is directly used as an uplink reference signal of each paired user, because lengths of base sequences of paired users are the same, PDP profiles of channel time domain impulse responses of the base sequences fully overlap. However, a cyclic shift of the base sequence is reflected as a location change of a PDP profile on the corresponding PDP profile. Therefore, the fully overlapped PDP profiles may be separated by using different cyclic shifts (CS) of the base sequences. Therefore, in the aligned pairing algorithm, a base sequence obtained after the CS is performed thereon may be used as an uplink reference signal of a user. A method for determining a CS value is an existing method agreed in the 3GPP-LTE physical layer resource mapping protocol, and details are not described herein again.

However, in a non-aligned pairing method (performing pairing on users that occupy different sizes of resource blocks), because lengths of base sequences are different ($M_{sc,m}^{RS}$ is different from $M_{sc,n}^{RS}$), orthogonality of the base sequences changes, and therefore, a CS value same as that in the aligned pairing algorithm cannot be used to separate PDP profiles. However, inspired by an aligned pairing idea, if time domain correlation between the base sequences is relatively strong, a proper CS value may still be configured, so that PDP profiles of channel responses corresponding to preferred uplink reference signals obtained based on the CS value are separated from each other. Based on this, the correlation strength between the first base sequence and the second base sequence may be used as the multiplexing evaluation information.

S603. Determine, based on the multiplexing evaluation information, whether the first user and the second user are successfully paired.

In a specific implementation, when the correlation strength between the first base sequence and the second base sequence is greater than a first preset threshold, it may be determined that the first user and the second user are successfully paired. The first preset threshold may be any number such as 0.8 or 0.9. When the correlation strength between the first base sequence and the second base sequence is less than the first preset threshold, it is determined that the first user and the second user are not successfully paired. A degree of influence of time domain correlation strength between the base sequences on channel estimation may be first quantized, and then statistics about a quantization result is collected and analyzed, to determine the first preset threshold.

Optionally, it can be learned from formula (12) that the basis kernel coefficient between the base sequences is in a negative correlation to the correlation strength. Therefore, when the basis kernel coefficient between the first base sequence and the second base sequence is less than a second preset threshold, it may be determined that the first user and the second user are successfully paired. It can be learned from a calculation manner of the basis kernel coefficient that the basis kernel coefficient of the two sequences can be determined by obtaining only four generation parameters: $q_m$, $N_{ZC,m}^{RS}$, $q_n$, and $N_{ZC,n}^{RS}$. Compared with calculation complexity of calculating the correlation strength of the two base sequences, a manner in which whether the two users are successfully paired is determined by using the basis kernel coefficient can effectively improve user pairing efficiency.

Optionally, in an actual application scenario, a service range of a base station may include a plurality of large-packet users and a plurality of small-packet users. Based on the foregoing user pairing method, in a possible implementation, the base station may determine, by using formula (13), a small-packet user x and a large-packet user y that are paired with each other, to be specific, the base station may select, from the plurality of large-packet users and the plurality of small-packet users, a large-packet user and a small-packet user with highest correlation strength between base sequences for pairing.

$$(x, y) = \operatorname{argmax}\left(\sum_{k=0}^{k=M_{sc,x}^{RS}-1} r_{u,v,x}(k)^* r_{u,v,y}(k)^*\right) \quad (13)$$

Here, argmax(f(θ)) means that a variable θ that makes f(θ) largest is calculated.

Optionally, the base station may further select the paired small-packet user x and large-packet user y in a manner of minimizing a basis kernel function shown in formula (14), to be specific, the base station may select, from the plurality of large-packet users and the plurality of small-packet users, a large-packet user and a small-packet user with a smallest basis kernel coefficient between base sequences for pairing.

$$(x, y) = \operatorname{argmin}\left(\frac{q_x}{N_{ZC,x}^{RS}} - \frac{q_y}{N_{ZC,y}^{RS}}\right) \quad (14)$$

Here, argmin(f(θ)) means that a variable θ that makes f(θ) smallest is calculated.

S604. When the first user and the second user are successfully paired, determine that the first user and the second user multiplex a same communication resource for communication.

Figure 7:
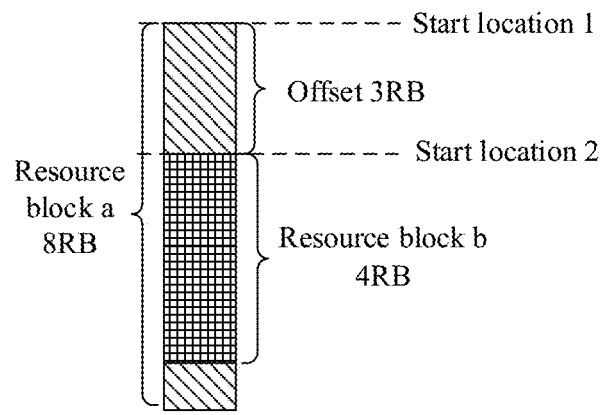
FIG. 7 is a schematic diagram of an offset according to an embodiment of this application.

For example, as shown in FIG. 7, the second user occupies a resource block a with a size of 8 RBs starting from a start location 1, and the first user occupies a resource block b with a size of 4 RBs starting from a start location 2. As shown in the figure, the resource block b belongs to the resource block a. If it is determined, based on the correlation strength or the basis kernel coefficient between the base sequences corresponding to the second user and the first user, that the second user and the first user are successfully paired, when the second user sends a signal to the base station by using the resource block a, the first user may send a signal to the base station by using the resource block b in the resource block a, to be specific, the two users multiplex a same communication resource: the resource block b in a process of communicating with the base station.

In a process in which the first user and the second user multiplex the same communication resource for communication, the base station may indicate the first user and the second user to send uplink reference signals, and separately estimate uplink channels of the first user and the second user based on channel responses of the uplink reference signals. Channel estimation may be performed based on, but not limited to, a PDP profile of a channel time domain impulse response. In this embodiment of this application, because sizes of resource blocks occupied by the first user and the second user are different, to improve a degree of separation of PDP profiles corresponding to the uplink reference signals of the two users so as to further improve spectral efficiency, after it is determined that the first user and the second user are successfully paired, the uplink reference signals of the first user and the second user may be preferentially selected. The uplink reference signal is obtained by performing a CS on a base sequence. Therefore, preferentially selecting the uplink reference signal is actually preferentially selecting a CS value of the base sequence. The preferentially selecting a CS value of the base sequence may specifically include the following steps.

First, an offset of a start location of a resource block occupied by the first user relative to a start location of a resource block occupied by the second user is determined. For example, as shown in FIG. 7, there is an interval of 3 RBs between the start location 1 and the start location 2, and an offset of the start location 1 relative to the start location 2 is 3 RBs.

Then, CS values of the first user and the second user are preferentially selected based on the offset separately. When the offset is L, an offset between the corresponding base sequences is 12 L. To obtain a preferred CS value, correlation strength when the relative offset between the base sequences of the first user and the second user is 12 L is first calculated:

$$r_{u,v,m}(k)^* r_{u,v,n}(k+12L)^* = e^{-j\frac{\pi q_m k(k+1)}{N_{ZC,m}^{RS}}} * e^{j\frac{\pi q_n (k+12L)(k+12L+1)}{N_{ZC,n}^{RS}}}, \quad (15)$$

$$r_{u,v,m}(k)^* r_{u,v,n}(k+12L)^* = \quad (16)$$

$$e^{-j\frac{\pi q_m k(k+1)}{N_{ZC,m}^{RS}}} * e^{j\frac{\pi q_n (k+1)+12\pi q_n L(k+12L+1)+k12\pi q_n L}{N_{ZC,n}^{RS}}},$$

-continued $$r_{u,v,m}(k)^* r_{u,v,n}(k+12L)^* = r_{u,v,m}(k)^* r_{u,v,n}(k)^* * e^{j\pi q_n \frac{12L(k+12L+1)+k12L}{N_{ZC,n}^{RS}}}, \text{ and} \quad (17)$$

$$r_{u,v,m}(k)^* r_{u,v,n}(k+12L)^* = \quad (18)$$
$$r_{u,v,m}(k)^* r_{u,v,n}(k)^* * e^{j\pi q_n \frac{24Lk}{N_{ZC,n}^{RS}}} * e^{j\pi q_n \frac{12L(12L+1)}{N_{ZC,n}^{RS}}}$$

Likewise, $$r_{u,v,m}(k)^* * r_{u,v,n}(k+12L) = e^{j\frac{\pi q_m k(k+1)}{N_{ZC,m}^{RS}}} * e^{-j\frac{\pi q_n (k+12L)(k+12L+1)}{N_{ZC,n}^{RS}}}, \text{ and} \quad (19)$$

$$r_{u,v,m}(k)^* * r_{u,v,n}(k+12L) = \quad (20)$$
$$r_{u,v,m}(k)^* * r_{u,v,n}(k)^* e^{-j\pi q_n \frac{24Lk}{N_{ZC,n}^{RS}}} * e^{-j\pi q_n \frac{12L(12L+1)}{N_{ZC,n}^{RS}}}$$

Figure 8:
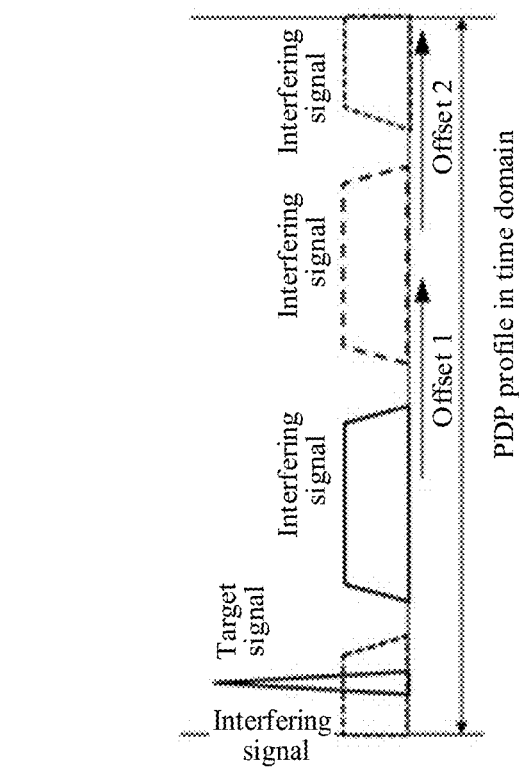
FIG. 8 is a schematic diagram in which a phase of a PDP profile changes with an offset according to an embodiment of this application.
Figure 8:
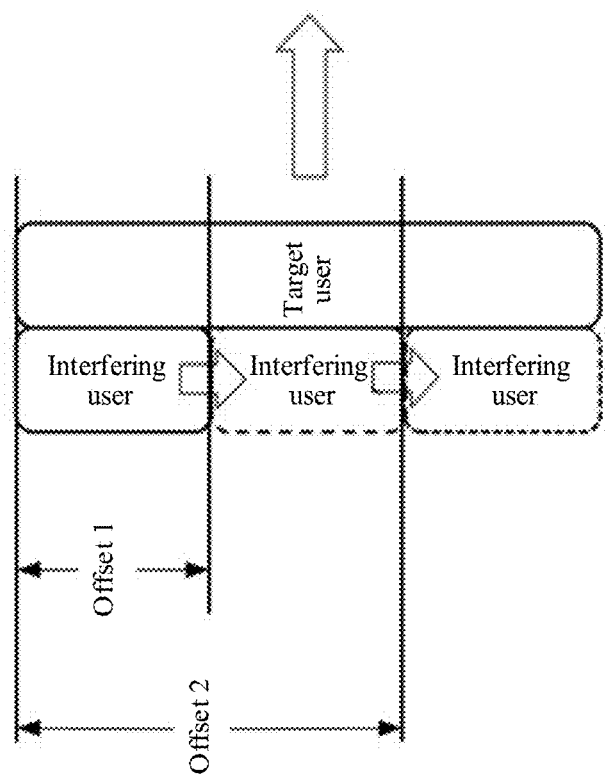

It can be learned from formula (18) and formula (20) that the relative offset of start locations of the resource blocks occupied by the first user and the second user is reflected as a cyclic shift of the base sequences corresponding to the first user and the second user in time domain, and further reflected as a phase (location) change of the PDP profiles corresponding to the first user and the second user. For example, as shown in FIG. 8, a start location of a resource block occupied by a target user remains unchanged, and when a start location of a resource block occupied by an interfering user changes, to be specific, an offset changes, a cyclic shift is performed on a location of a PDP profile in time domain corresponding to the interfering user in one signal period, and a phase changes accordingly. Therefore, a phase (location) of a PDP profile corresponding to an uplink reference signal generated based on a preset standard CS value may be used as a basis, and phase compensation is performed on the PDP profile by adjusting the standard CS value, so as to separate the PDP profiles corresponding to the first user and the second user. The preset standard CS value is a CS value configured for the first user/second user when aligned pairing is performed on the first user/second user.

It should be noted that, it can be learned from formula (18) and formula (20) that CSs of the two base sequences in time domain may be all equivalent to a CS performed on the base sequence $r_{u,v,m}(k)$ of the first user, or may be all equivalent to a CS performed on the base sequence $r_{u,v,n}(k)$ of the second user. However, because the first user is a small-packet user, and the second user is a large-packet user, in an actual scenario, the large-packet user may usually be paired with at least one small-packet user. Therefore, if the CS is equivalent to a CS of the large-packet user, different small-packet users paired with the large-packet user require different amounts of phase compensation performed for the large-packet user, and consequently, a conflict occurs. Therefore, in this embodiment of this application, the CS is equivalent to a CS of the small-packet user, and a CS value of the large-packet user is kept as a standard CS value. Each small-packet user can be paired with only one large-packet user. Therefore, the small-packet user can adjust a standard CS value of the small-packet user based on the equivalent CS (equivalent to performing CS compensation), so as to perform phase compensation on the PDP profile.

Then, compensation is performed on a standard CS value corresponding to the first user based on a CS value equivalent to the CS of the first user, where assuming that the standard CS value corresponding to the first user is $n_{cs,m}$, $$n_{cs,m} = [\text{DMRS}_m^{(1)} + \text{DMRS}_m^{(2)} + nPN_m(n_s)] \% \text{ RBSize} \quad (21)$$

In an LTE system, RBSize=12, $\text{DMRS}_m^{(1)}$ is configured by a higher layer parameter, and $\text{DMRS}_m^{(2)}$ is configured by uplink scheduling information. $nPN_m(n_s)$ is a pseudo-random sequence shown in formula (22). $nPN_m(n_s)$ is updated by a pseudo-random sequence generator at the beginning of each radio frame based on the ID of a cell in which the first user is located. $N_{symb}^{UL}$ represents a quantity of symbols of single carrier frequency division multiple access (Single-Carrier Frequency-Division Multiple Access, SC-FDMA) in an uplink slot.

$$nPN_m(n_s) = \sum_{i=0}^{7} c(8N_{symb}^{UL} * n_s + 1) * 2^i \quad (22)$$

Assuming that the CS value of the first user after CS compensation is performed is $n_{cs}$, according to formula (18) and formula (20), $n_{cs}$ should meet:

$$e^{j\frac{2\pi n_{cs} k}{12}} \approx e^{j\frac{2\pi n_{cs,m} k}{12}} * e^{j 2\pi q_n \frac{12Lk}{N_{ZC,n}^{RS}}}, \quad (23)$$

and $$e^{j\frac{n_{cs} k}{12}} \approx e^{j\frac{n_{cs,m} k}{12}} * e^{j q_n \frac{12Lk}{N_{ZC,n}^{RS}}} \quad (24)$$

Because the CS value can only be an integer value, after optimization, when values at two ends of a symbol of approximate equal in formula (24) are closest, a value of $n_{cs}$ is:

$$n_{cs} = \left(n_{cs,m} + 12 * \left[1 - \left(q_n^* \frac{12L}{N_{ZC,n}^{RS}}\right)\%1\right]\right)\%12 \quad (25)$$

According to formula (25), a CS compensation value $n_{cs,com}$ of the first user may be obtained and is as follows:

$$n_{cs,com} = \left(12 * \left[1 - \left(q_n \frac{12L}{N_{ZC,n}^{RS}}\right)\%1\right]\right)\%12 \quad (26)$$

In conclusion, when the offset L is equal to 0, because the CS equivalent to the CS of the first user is equal to 0, there is no need to perform CS compensation, and it is determined that a preferred CS value of the first user is the same as the standard CS value. Therefore, a CS may be performed on the first base sequence based on the standard CS value corresponding to the first user, to obtain the uplink reference signal of the first user. The uplink reference signal of the second user is obtained by performing a CS on the second base sequence based on the standard CS value corresponding to the second user.

For example, if the base sequence of the first user is $r_{u,v,m}(k)$, and the standard CS value is $n_{cs,m}$, the uplink reference signal of the first user is:

$$D_m = r_{u,v,m}(k) * e^{j\frac{2\pi n_{cs,m} k}{12}} \quad (27)$$

When the offset L is not equal to 0, and the CS equivalent to the CS of the first user is not equal to 0, it is determined that a preferred CS value of the first user is a sum of the standard CS value and the CS compensation value, to be specific, $n_{cs}$ shown in formula (25). Therefore, a CS may be performed on the first base sequence based on $n_{cs}$ to obtain the uplink reference signal of the first user. The uplink reference signal of the second user is obtained by performing a CS on the second base sequence based on the standard CS value corresponding to the second user.

Finally, the first user and the second user may multiplex a same spectrum resource to send respective uplink reference signals to the base station, and the base station estimates the uplink channels of the first user and the second user based on a PDP profile of a channel time domain impulse response of each uplink reference signal, and indicates the first user and the second user to send useful signals.

It should be noted that: (1) it can be learned from formula (18) that, if correlation strength (for example, formula (11)) obtained through calculation when the offset L is equal to 0 can be used to determine that to-be-paired users are successfully paired, in a case in which sizes of resource blocks occupied by the to-be-paired users remain unchanged, a change of the offset L does not affect a pairing result, and a case in which the offset corresponding to the first user and the second user may not be considered when it is determined, based on the correlation strength, whether the first user and the second user can be successfully paired is precisely based on this feature; (2) a base sequence used by each user to generate a reference signal is known to the user and the base station, and therefore, after determining a preferred CS value of each user, the base station only needs to send the CS value to the user in a form of scheduling information.

Figure 9:
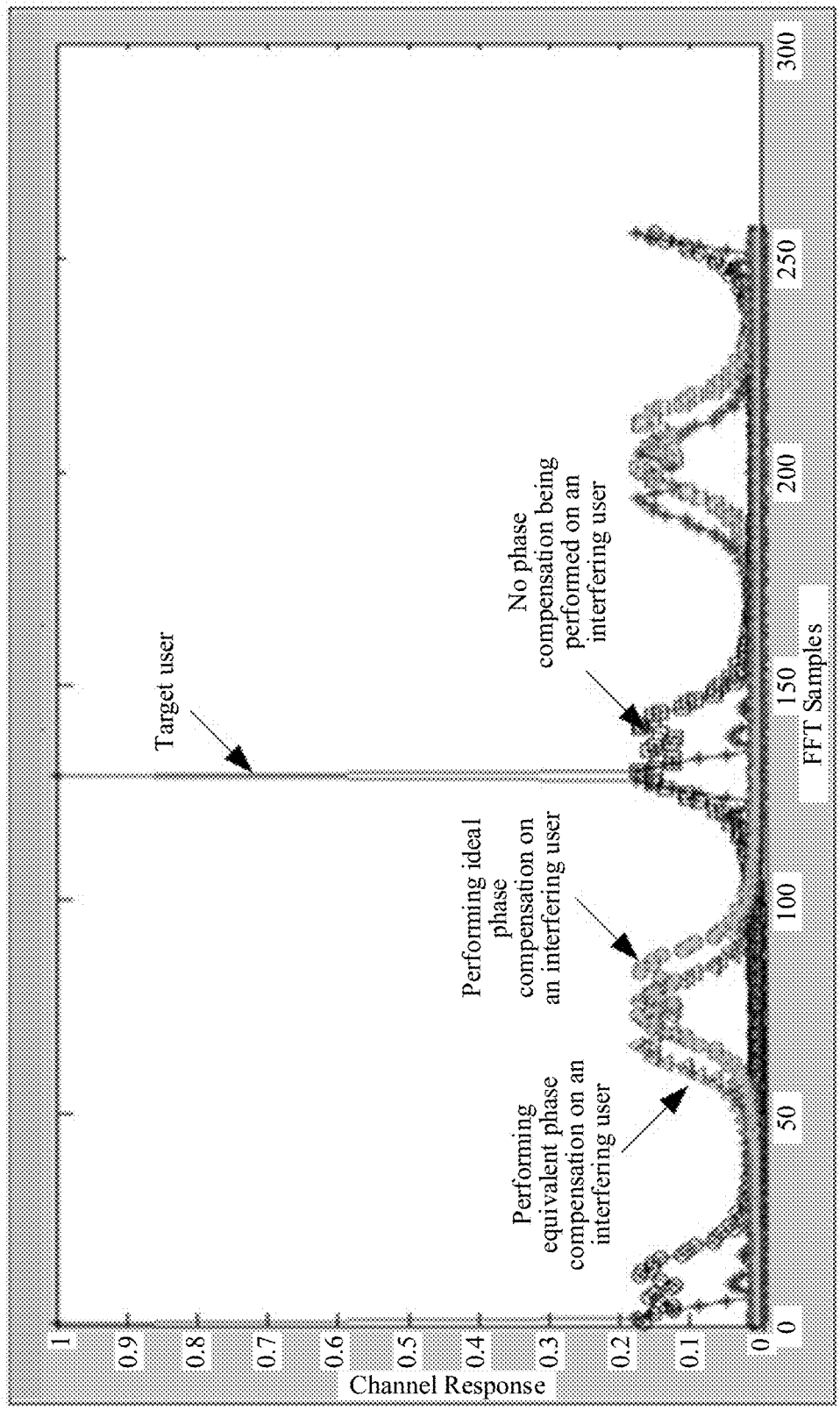
FIG. 9 is a schematic diagram of a beneficial effect of a user pairing algorithm according to an embodiment of this application.

For example, as shown in FIG. 9, PDP profiles of channel time domain impulse responses corresponding to uplink reference signals of a 5RB user (a user that occupies a resource block with a size of 5 RBs) and a 10RB user are obtained through experiments, where an offset corresponding to the 5RB user and the 10RB user is not equal to 0. As shown in the figure, the 5RB user may be regarded as a target user, and the 10RB user may be regarded as an interfering user. This example applies only to a scenario in which two users are paired. Therefore, compensation may be performed on the large-packet user of 10 RBs, and a signal of the small-packet user of 5 RBs remains unchanged. If phase compensation is not performed on a PDP profile of the interfering user, a peak of the PDP profile of the interfering user overlaps with a peak of a PDP profile of the target user, and consequently, interference is caused. If the method for performing equivalent phase compensation through CS compensation in this embodiment of this application is used, peaks of the two PDP profiles are staggered, thereby achieving an objective of interference cancellation. In addition, there is a difference between compensation effects of ideal phase compensation and the equivalent phase compensation performed through CS compensation, because a CS value is a discrete integer value while actual ideal phase compensation values should be consecutive values.

In this embodiment of this application, the first generation parameter of the first base sequence of the first user and the second generation parameter of the second base sequence of the second user are determined; the multiplexing evaluation information of the first base sequence and the second base sequence is determined based on the first generation parameter and the second generation parameter, where the multiplexing evaluation information may include the correlation strength between the first base sequence and the second base sequence; it is determined, based on the multiplexing evaluation information, whether the first user and the second user are successfully paired, where when the correlation strength is greater than a preset threshold, it may be determined that the first user and the second user are successfully paired, and when the first user and the second user are successfully paired, it is determined that the first user and the second user multiplex the same communication resource for communication. In addition, after whether the first user and the second user are successfully paired is determined, the uplink reference signals of the first user and the second user may be further preferentially selected, thereby improving flexibility of pairing between users and spectral efficiency implemented by jointly scheduling paired users.

Figure 10:
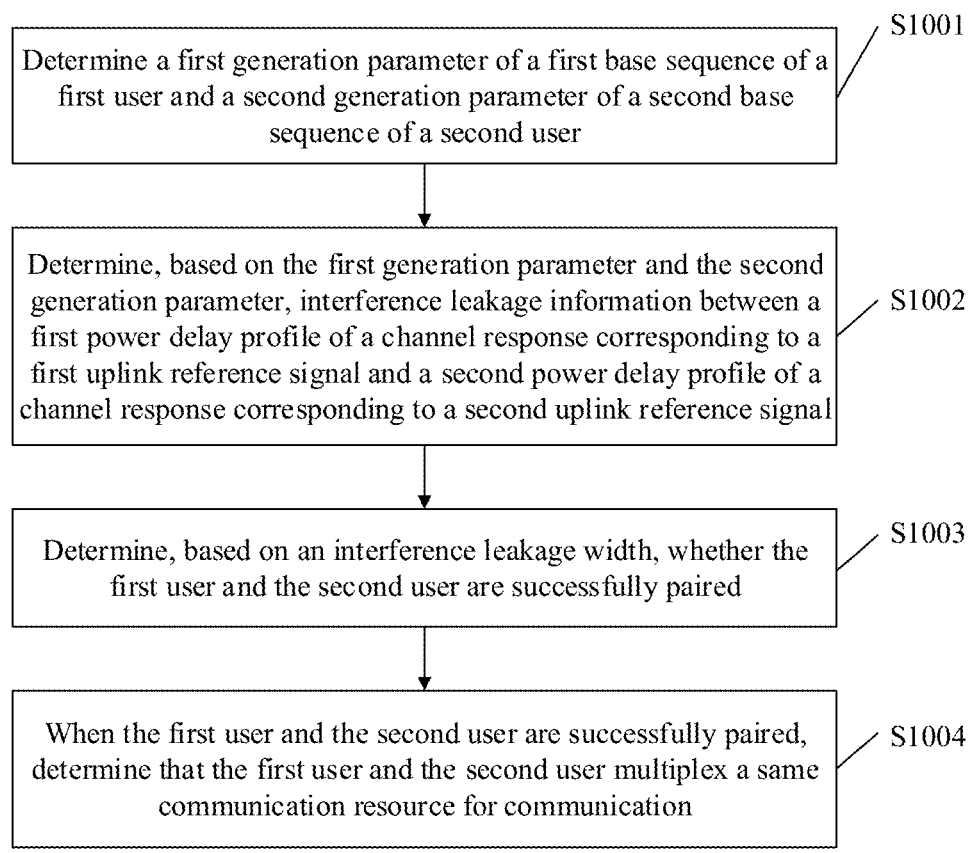
FIG. 10 is a schematic flowchart of a user pairing method according to another embodiment of this application.

FIG. 10 is a schematic flowchart of a user pairing method according to another embodiment of this application. The method includes, but is not limited to, the following steps.

S1001. Determine a first generation parameter of a first base sequence of a first user and a second generation parameter of a second base sequence of a second user. This step is the same as S601 in the foregoing embodiment, and details of this step are not described again.

S1002. Determine, based on the first generation parameter and the second generation parameter, interference leakage information between a first power delay profile of a channel response corresponding to the first uplink reference signal and a second power delay profile of a channel response corresponding to the second uplink reference signal.

In a specific implementation, the interference leakage information includes an interference leakage width between the first power delay profile and the second power delay profile. It should be noted that the first power delay profile herein is a PDP profile of a channel time domain impulse response corresponding to the uplink reference signal that is of the first user and that is obtained by performing a CS on the first base sequence based on a standard CS value corresponding to the first user, and the second power delay profile is a PDP profile of a channel time domain impulse response corresponding to the uplink reference signal that is of the second user and that is obtained by performing a CS on the second base sequence based on a standard CS value corresponding to the second user. The standard CS value is a CS value configured for the first user/second user when aligned pairing is performed on the first user/second user. Generally, for ease of analyzing interference between signals, in this embodiment of this application, the first user is used as a target user, the second user is regarded as an interfering user of the first user, and the interference leakage width may be a diffusion width of interference from the second power delay profile to the first power delay profile in time domain. Calculating the interference leakage width may include the following steps.

First, a first CS component in the standard CS value of the first user, a second CS component in the standard CS value of the second user, and an offset $\Delta$ of a start location of a resource block occupied by the first user relative to a start location of a resource block occupied by the second user may be obtained. Assuming that nb is the standard CS value corresponding to the first user, it can be learned based on the 36.211 protocol that $$nb = [DMRS_m^{(1)} + DMRS_m^{(2)} + nPN_m(n_s)]\% \text{ RBSize} \quad (28)$$

Therefore, the first CS component $n0 = DMRS_m^{(2)}$. In an LTE system, RBSize=12, $DMRS_m^{(1)}$ is configured by a higher layer parameter, and $DMRS_m^{(2)}$ is configured by uplink scheduling information. Similarly, the standard CS value of the second user may be obtained as $[DMRS_n^{(1)} + DMRS_n^{(2)} + nPN_n(n_s)]\%$ RBSize, and the second CS component $n1 = DMRS_n^{(2)}$.

Then, pilot signals $s_m$ and $s_n$ of the first user and the second user are determined based on the first generation parameters $q_m$ and $N_{ZC,m}^{RS}$, the second generation parameters $q_n$ and $N_{ZC,n}^{RS}$, the first CS component n0, the second CS component n1, and the offset $\Delta$, where $$s_m(k) = e^{-j\frac{\pi q_m k(k+1)}{N_{ZC,m}^{RS}}} e^{\frac{j2\pi k(n0+nb)}{12}}, 0 \le k \le N_{ZC,m}^{RS} - 1, \quad (29)$$

and $$s_n(k) = e^{-j\frac{\pi q_n(k+\Delta)(k+\Delta+1)}{N_{ZC,n}^{RS}}} e^{\frac{j2\pi(k+\Delta)(n1+nb)}{12}}, 0 \le k \le N_{ZC,n}^{RS} - 1 \quad (30)$$

Here, k is a sequence number of a subcarrier, and $q_m$, $N_{ZC,m}^{RS}$, $q_n$, and $N_{ZC,n}^{RS}$ are respectively shown in formulas (3) to (5) and formulas (8) to (10) in the foregoing embodiment.

Then, cross correlation of $s_m(k)$ and $s_n(k)$ is calculated, to be specific, $$s_n(k) * s_m(k)^* = e^{j\frac{\pi q_m k(k+1)}{N_{ZC,m}^{RS}}} * e^{-j\frac{\pi q_n(k+\Delta)(k+\Delta+1)}{N_{ZC,n}^{RS}}} * \quad (31)$$

$$e^{\frac{-j2\pi k(n0+nb)}{12}} * e^{\frac{j2\pi(k+\Delta)(n1+nb)}{12}}$$

$$= e^{-j2\pi\left[\frac{q_n k(k+1)}{2N_{ZC,n}^{RS}} - \frac{q_m k(k+1)}{2N_{ZC,m}^{RS}}\right]} e^{-j2\pi\left[\frac{2q_n\Delta k + \Delta + \Delta^2}{2N_{ZC,n}^{RS}}\right]}$$

$$e^{j2\pi\left[\frac{(n1-n0)k}{12}\right]} e^{j\frac{2\pi\Delta(n1+nb)}{12}}$$

$$= e^{-j2\pi\gamma k(k+1)} e^{-j2\pi\left[\frac{q_n\Delta}{N_{ZC,n}^{RS}} - \frac{(n1-n0)}{12}\right]k} e^{\frac{j2\pi\Delta(n1+nb)}{12} - \frac{j\pi q_n(\Delta+\Delta^2)}{N_{ZC,n}^{RS}}}$$

$$= e^{-j2\pi\gamma k(k+1)} e^{-j2\pi\tau k} e^{\frac{j2\pi\Delta(n1+nb)}{12} - \frac{j\pi q_n(\Delta+\Delta^2)}{N_{ZC,n}^{RS}}},$$

Here, $$\gamma = \frac{1}{2}\left[\frac{q_n}{N_{ZC,n}^{RS}} - \frac{q_m}{N_{ZC,m}^{RS}}\right],$$

and $$\tau = \frac{q_n\Delta}{N_{ZC,n}^{RS}} - \frac{(n1-n0)}{12}.$$

Finally, it can be learned from formula (31) that a quadratic term of the subcarrier k in time domain is $f=-\gamma k(k+1)$. Therefore, a derivative of k may be calculated in f, to obtain a diffusion range of interference in time domain. A result of derivation calculation of k is $-\gamma(2k+1)$, and a value range of k is $0 \le k < M_{sc,m}^{RS}$. Therefore, the diffusion range of the interference in time domain is $\gamma \sim \gamma(2M_{sc,m}^{RS}-1)$, and a central location is $c_{center}=\gamma M_{sc,m}^{RS}+\tau$. The interference leakage width $\Omega=|\gamma(2M_{sc,m}^{RS}-1)|$ is obtained based on the diffusion range. $M_{sc,m}^{RS}$ is a quantity of subcarriers occupied by the first user, to be specific, a length of the uplink reference signal of the first user. Further, because $M_{sc,m}^{RS}$ is generally much greater than 1, $\Omega=|2\gamma M_{sc,m}^{RS}|$.

It should be noted that the foregoing process of calculating the interference leakage width may be used as a derivation process of a general calculation formula of the interference leakage width.

Finally, the general calculation formula $$\left[\frac{q_{nx}}{N_{ZC,n}^{RS}} - \frac{q_m}{N_{ZC,m}^{RS}}\right] * M_{sc,m}^{RS}$$

of the interference leakage width is obtained. Therefore, when the user pairing method provided in this embodiment of this application is actually used, calculation may be directly performed based on the determined first generation parameter and second generation parameter by using the formula.

S1003. Determine, based on the interference leakage width, whether the first user and the second user are successfully paired.

In a specific implementation, when the interference leakage width is not greater than an interference leakage threshold, it may be determined that the first user and the second user are successfully paired; otherwise, it is determined that the first user and the second user are not successfully paired. When the interference leakage width does not exceed the interference leakage threshold, after the first user and the second user are successfully paired, uplink reference signals of the two users may be preferentially selected, so that PDP profiles of channel responses corresponding to the uplink reference signals received by a base station are separated from each other, thereby ensuring accuracy of channel estimation and spectral efficiency implemented by jointly scheduling paired users. However, due to a limitation of a condition such as a communication resource, when Q exceeds the interference leakage threshold, because signal interference between to-be-paired users is severe, initial intentions of user pairing and joint scheduling cannot be implemented by preferentially selecting an uplink reference signal. Therefore, it may be determined that the first user and the second user are not successfully paired. The interference leakage threshold is related to a quantity of user multiplexing layers of a communications system in which the first user and the second user are located. Therefore, the following may be obtained: a quantity of first user multiplexing layers $L_{a1}$ corresponding to the first user, to be specific, a quantity of multiplexing layers of a small-packet user being $L_{a1}$ for a same resource block; a quantity of second user multiplexing layers $L_{a2}$ corresponding to the second user, to be specific, a quantity of multiplexing layers of a large-packet user being $L_{a2}$ for a same resource block; and a delay spread guard length $t_{cp}$ between users that is configured in a communications system, where $t_{cp}$ is used to ensure that multipath delay spread between the users does not cause mixing and overlapping, and $t_{cp}$ may be but is not limited to $\frac{1}{12}$. Then, the interference leakage threshold $\varphi$ corresponding to the interference leakage width is determined based on $L_{a1}$, $L_{a2}$, and $t_{cp}$, and a specific calculation method of $\varphi$ is shown in formula (32).

$$\varphi = \frac{10-(L_{a2}+L_{a1})}{12} - 2t_{cp} \quad (32)$$

Optionally, based on the interference leakage width $\Omega=|2\gamma M_{sc,m}^{RS}|$, it can be learned that $M_{sc,m}^{RS}$ may be adjusted by adjusting a size of the resource block occupied by the first user, so that a size of the interference leakage width changes. Therefore, to improve a success rate of user pairing, when the interference leakage width $\Omega$ does not meet $\Omega \le \varphi$, the size of the resource block occupied by the first user may be adjusted, for example, adjusted from 3 RBs to 5 RBs, so as to adjust the interference leakage width.

Then, based on the adjusted interference leakage width Ω, it is determined again whether the first user and the second user are successfully paired. If the adjusted interference leakage width Ω does not exceed the interference leakage threshold φ, it is determined that the first user and the second user are successfully paired, and the resource block occupied by the first user is stretched based on the adjusted size of the resource block. Otherwise, it is determined that the first user and the second user are not successfully paired.

S1004. When the first user and the second user are successfully paired, determine that the first user and the second user multiplex a same communication resource for communication.

In a process in which the first user and the second user multiplex the same communication resource for communication, the base station may first indicate the first user and the second user to send uplink reference signals, and then separately estimate uplink channels of the first user and the second user based on channel responses of the uplink reference signals. Signal estimation may be performed based on, but not limited to, a PDP profile of a channel response. In this embodiment of this application, because sizes of resource blocks occupied by the first user and the second user are different, to improve a degree of separation of PDP profiles corresponding to the uplink reference signals of the two users so as to further improve spectral efficiency, after the first user and the second user are successfully paired, optionally, the uplink reference signals of the first user and the second user may be preferentially selected. The uplink reference signal is obtained by performing a CS on a base sequence. Therefore, preferentially selecting the uplink reference signal is actually preferentially selecting a CS value of the base sequence. The preferentially selecting a CS value of the base sequence may specifically include the following steps.

It should be noted that valid CS values that can be used for selection are several discrete integer values, and may include 0, 1, 2, 3, 4, 6, 8, 9, and 10. A location corresponding to each CS value in time domain is shown in formula (33). In formula (33), S={0, 1, 2, 3, 4, 6, 8, 9, 10}, and mod is a modulo function.

$$c_\delta = \frac{\mathrm{mod}\,(12-\delta, 12)}{12} = \mathrm{mod}\left(1-\frac{\delta}{12},\ 1\right), \delta \in S \quad (33)$$

First, because a quantity of valid CS values that can be used for selection is limited, and it is observed that there are two invalid CS locations: CS=5 and CS=7 on two sides of CS=6, in order to enable the interfering user to use the invalid CS locations as much as possible, so that the valid CS locations are reserved for the target user, for the second user (e.g., interfering user), the CS value of the base sequence may be configured, so that a center of an interfering signal (e.g., the second delay power profile) is as close as possible to the location of CS=6. The center of the interfering signal is related to the quantity of second user multiplexing layers La2 and a cyclic shift guard interval between the first base sequence and the second base sequence. Therefore, the cyclic shift guard interval (denoted as p) between the first base sequence and the second base sequence may be first determined.

$$\mu = \gamma M_{sc,m}^{RS} + \frac{q_n \Delta}{N_{ZC,n}^{RS}} + \frac{1}{2}\left(\frac{L_{a2}-1}{12} + t_{CP}\right) \quad (34)$$

Then, a preferred CS value of the second base sequence is determined based on $L_{a2}$ and μ. M candidate CS values of the second user may be first determined based on $L_{a2}$. To ensure communication quality and a success rate of pairing, $L_{a2}$ and $L_{a1}$ usually do not exceed three layers in an actual communication scenario. Therefore, the candidate CS values of the second user may include 1, 2, and 3, and the three candidate CS values are represented in a form of a set to obtain $T_1$={1, 2, 3}. Then, M candidate central locations of the second power delay profile that correspond to the M candidate CS values are determined based on μ, where a location corresponding to each candidate CS value in time domain may be used as a candidate central location. Then, a candidate central location closest to a target location in the M candidate central locations is determined as a target central location, and a candidate CS value corresponding to the target central location is determined as the preferred CS value (denoted as $n_2$) of the second user, where the target location may be a location corresponding to CS=6 in time domain. In conclusion, $n_2$ may be determined according to formula (35).

$$n_2 = \arg\min_{n, n \in T_1}\left|\mathrm{mod}\left(\mu - \frac{n}{12},\ 1\right) - \frac{6.5}{12}\right| \quad (35)$$

Optionally, when $L_{a2}$=2, to be specific, when the second user is further paired with another large-packet user while being paired with the first user, $n_2$−1 may be configured as a CS value of the large-packet user. Similarly, when $L_{a2}$=3, $n_2$−1 and $n_2$−2 are respectively configured as CS values of two large-packet users paired with the second user.

Figure 11:
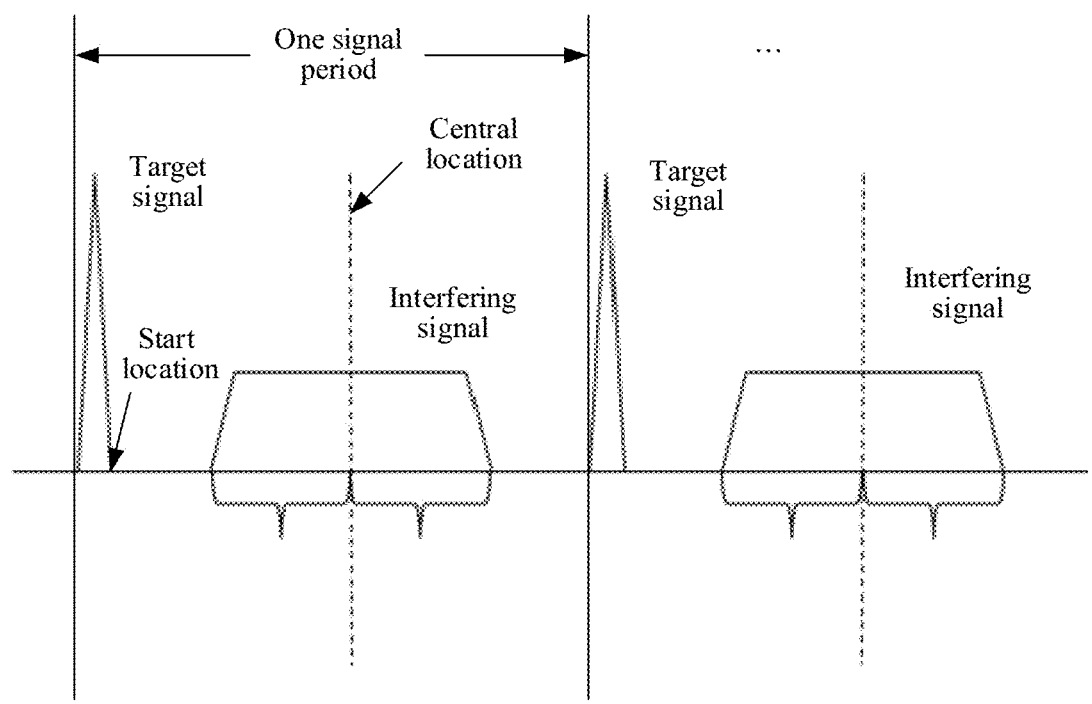
FIG. 11 is a schematic diagram of location distribution of PDP profiles corresponding to paired users according to an embodiment of this application.

Then, a preferred CS value (denoted as n1) of the first user is determined based on $n_2$. N candidate start locations of the first power delay profile (a target signal) that correspond to N candidate CS values in a preset CS value set may be first determined, a location corresponding to each CS value in time domain may be used as the candidate start location, and the preset CS value set may be $T_2$={0, 2, 3, 4, 6, 8, 9, 10}. As shown in FIG. 11, to separate the target signal from the interfering signal to the greatest extent, a second candidate CS value corresponding to a candidate start location furthest from the target central location in the N candidate start locations may be used as $n_1$, where the target central location g is obtained according to formula (36):

$$g = \mathrm{mod}\left(\mu - \frac{n_2}{12} + 0.5, 1\right) \quad (36)$$

Therefore, a method for determining $n_1$ is shown in formula (37).

$$n_1 = \arg\max_{\delta, \delta \in T_2}\left|c_\delta - \mathrm{mod}\left(\mu - \frac{n_2}{12} + 0.5, 1\right)\right| \quad (37)$$

Optionally, when the first user is further paired with one or two other small-packet users while being paired with the second user, $n_3$ and $n_4$ may be respectively used as CS values of the one or two small-packet users.

$$n_3 = \arg\max_{\delta, \delta \in T_2}\left|c_\delta - 1 - \mathrm{mod}\left(\mu - \frac{n_2}{12} + 0.5, 1\right)\right| \quad (38)$$

-continued $$n_4 = \arg\max_{\delta, \delta \in T_2} \left| c_\delta + 1 - \text{mod}\left(\mu - \frac{n_2}{12} + 0.5, 1\right) \right| \quad (39)$$

Finally, CSs are separately performed on the first base sequence and the second base sequence based on n1 and n2, to obtain preferred uplink reference signals of the first user and the second user. The first user and the second user may send respective uplink reference signals to the base station by using a same spectrum resource, and the base station estimates uplink channels of the first user and the second user based on a PDP profile of a channel time domain impulse response of each uplink reference signal, so as to perform effective uplink communication subsequently.

Figure 12:
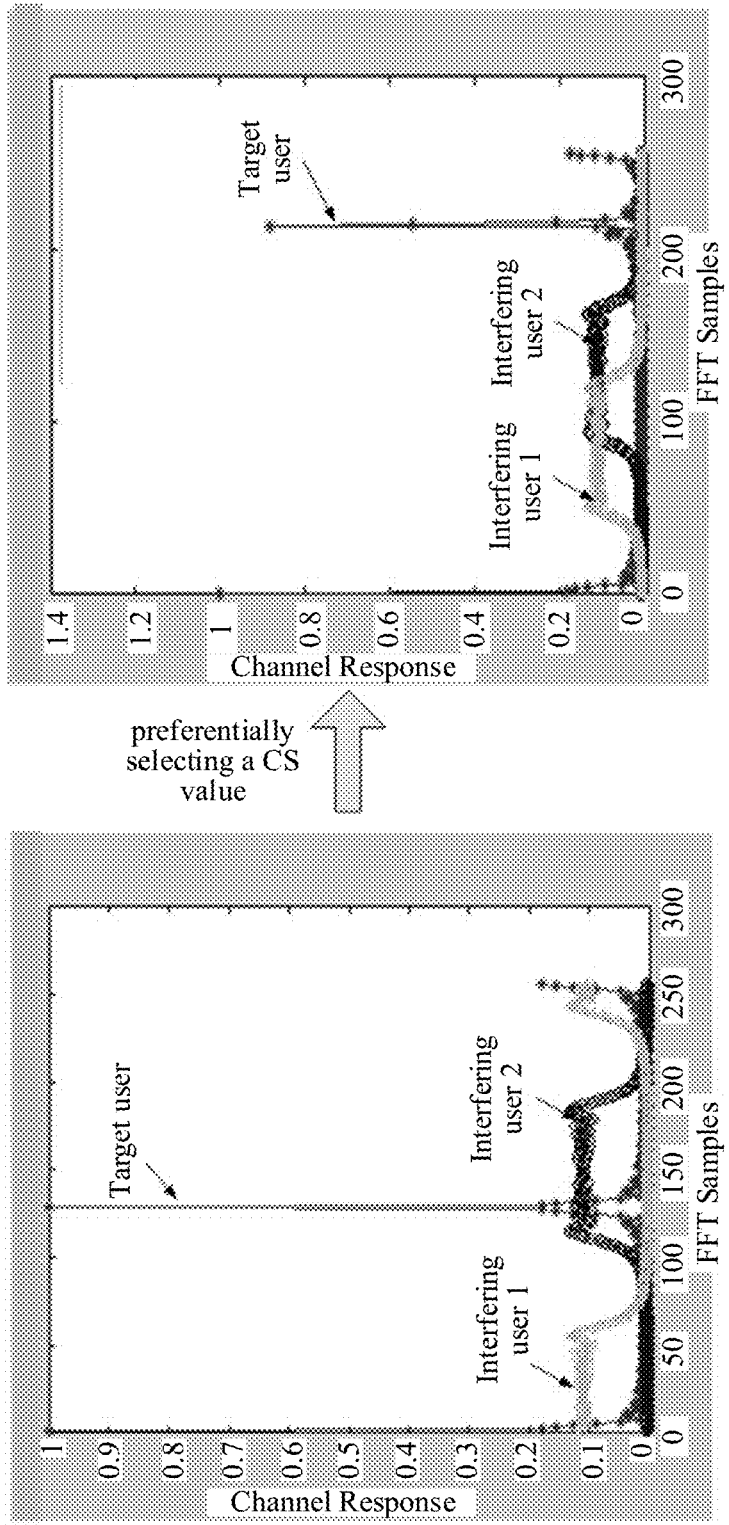
FIG. 12 is a schematic diagram of PDP profiles of a plurality of paired users according to an embodiment of this application.

For example, as shown in FIG. 12, it is determined, based on an interference leakage width, that a target user and an interfering user are successfully paired. If CS values corresponding to the paired users are not preferentially selected, and an uplink reference signal is directly generated based on a standard CS value corresponding to each user, PDP profiles of channel responses corresponding to uplink reference signals of the paired users overlap with each other, and consequently, inaccurate channel estimation is caused. If the CS values of the paired users are preferentially selected according to formulas (35) and (37) after successful pairing, and the preferred uplink reference signals are determined based on the preferred CS values, the PDP profiles of the interfering user and the target user are separated. Therefore, the base station can accurately estimate an uplink channel of the target user.

In this embodiment of this application, the base station first determines the first generation parameter of the first base sequence of the first user and the second generation parameter of the second base sequence of the second user, where the first base sequence is used to generate the first uplink reference signal of the first user, and the second base sequence is used to generate the second uplink reference signal of the second user. Then, based on the first generation parameter and the second generation parameter, the interference leakage information between the first power delay profile of the channel response corresponding to the first uplink reference signal and the second power delay profile of the channel response corresponding to the second uplink reference signal is determined. Afterwards, it is determined, based on the interference leakage width, whether the first user and the second user are successfully paired, and when the first user and the second user are successfully paired, it is determined that the first user and the second user multiplex the same communication resource for communication. This may improve flexibility and a success rate of pairing between the large-packet user and the small-packet user.

Figure 13:
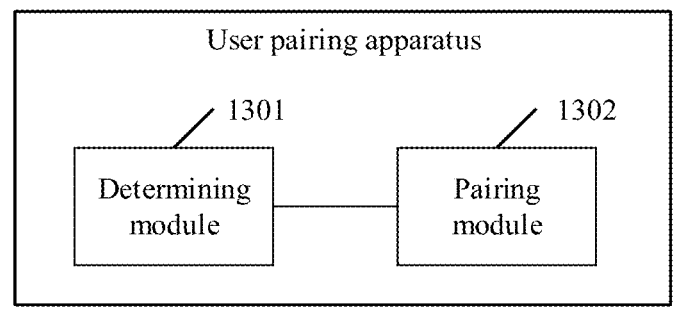
FIG. 13 is a schematic structural diagram of a user pairing apparatus according to an embodiment of this application.

FIG. 13 is a schematic structural diagram of a user pairing apparatus according to an embodiment of this application. As shown in the figure, the user pairing apparatus in this embodiment of this application includes:

a determining module 1301, configured to: determine a first generation parameter of a first base sequence of a first user and a second generation parameter of a second base sequence of a second user, where the first base sequence is used to generate a first uplink reference signal of the first user, and the second base sequence is used to generate a second uplink reference signal of the second user; determine multiplexing evaluation information of the first base sequence and the second base sequence based on the first generation parameter and the second generation parameter, where the multiplexing evaluation information includes at least one of correlation strength between the first base sequence and the second base sequence, and interference leakage information between a first power delay profile of a channel response corresponding to the first uplink reference signal and a second power delay profile of a channel response corresponding to the second uplink reference signal; and a pairing module 1302, configured to: determine, based on the multiplexing evaluation information, whether the first user and the second user are successfully paired; and determine, when the first user and the second user are successfully paired, that the first user and the second user multiplex a same communication resource for communication.

Optionally, the pairing module 1302 is further configured to: determine, when the correlation strength is greater than a first preset threshold, that the first user and the second user are successfully paired.

Optionally, the user pairing apparatus in this embodiment of this application further includes a preferentially selecting module, configured to: determine, after it is determined that the first user and the second user are successfully paired, an offset of a start location of a resource block occupied by the first user relative to a start location of a resource block occupied by the second user; and generate the first uplink reference signal based on the offset and the first base sequence, where the first uplink reference signal is used to estimate an uplink channel of the first user when the first user and the second user multiplex the same communication resource for communication.

Optionally, the preferentially selecting module is further configured to: perform, when the offset is zero, a cyclic shift on the first base sequence based on a preset standard cyclic shift value to obtain the first uplink reference signal.

Optionally, the preferentially selecting module is further configured to: determine, when the offset is not zero, a cyclic shift compensation value corresponding to the offset; and perform a cyclic shift on the first base sequence based on a preset standard cyclic shift value and the cyclic shift compensation value to obtain the first uplink reference signal.

Optionally, the determining module 1301 is further configured to: determine a basis kernel coefficient between the first base sequence and the second base sequence based on the first generation parameter and the second generation parameter, where the correlation strength is in a negative correlation to the basis kernel coefficient.

Optionally, the pairing module 1302 is further configured to: determine, when the basis kernel coefficient is less than a second preset threshold, that the first user and the second user are successfully paired.

The interference leakage information includes an interference leakage width between the second power delay profile and the first power delay profile.

Optionally, the determining module 1301 is further configured to: obtain a quantity of first user multiplexing layers corresponding to the first user, a quantity of second user multiplexing layers corresponding to the second user, and a multipath delay guard interval of a communications system in which the first user and the second user are located; and determine an interference leakage threshold between the first user and the second user based on the quantity of first user multiplexing layers, the quantity of second user multiplexing layers, and the multipath delay guard interval.

Optionally, the pairing module 1302 is further configured to: determine, when the interference leakage width is not greater than the interference leakage threshold, that the first user and the second user are successfully paired.

Optionally, the preferentially selecting module is further configured to: determine a cyclic shift guard interval between the first base sequence and the second base sequence; determine a first cyclic shift value of the second base sequence based on the quantity of second user multiplexing layers and the cyclic shift guard interval; and perform a cyclic shift on the second base sequence based on the first cyclic shift value to obtain the second uplink reference signal, where the second uplink reference signal is used to estimate an uplink channel of the second user when the first user and the second user multiplex the same communication resource for communication.

Optionally, the preferentially selecting module is further configured to: determine M first candidate cyclic shift values based on the quantity of second user multiplexing layers; determine, based on the cyclic shift guard interval, M candidate central locations of the second power delay profile that correspond to the M first candidate cyclic shift values; and use, as a target central location, a candidate central location closest to a target location in the M candidate central locations, and use a first candidate cyclic shift value corresponding to the target central location as the first cyclic shift value.

Optionally, the preferentially selecting module is further configured to: determine N candidate start locations of the first power delay profile that correspond to N second candidate cyclic shift values in a preset cyclic shift value set; use, as a second cyclic shift value, a second candidate cyclic shift value corresponding to a candidate start location furthest from the target central location in the N candidate start locations; and perform a cyclic shift on the first base sequence based on the second cyclic shift value, to obtain the first uplink reference signal.

The first generation parameter may include a size of a resource block occupied by the first user.

Optionally, the pairing module 1302 is further configured to: determine, when the interference leakage width is greater than the interference leakage threshold, that pairing between the first user and the second user fails. Alternatively, when the interference leakage width is greater than the interference leakage threshold, the size of the resource block is adjusted, and whether the first user and the second user are successfully paired is determined based on the adjusted size of the resource block.

It should be noted that, for implementation of each module, reference may be correspondingly made to corresponding description of the method embodiments shown in FIG. 6 and FIG. 10, so as to perform methods and functions performed by the user pairing apparatus in the foregoing embodiments.

Figure 14:
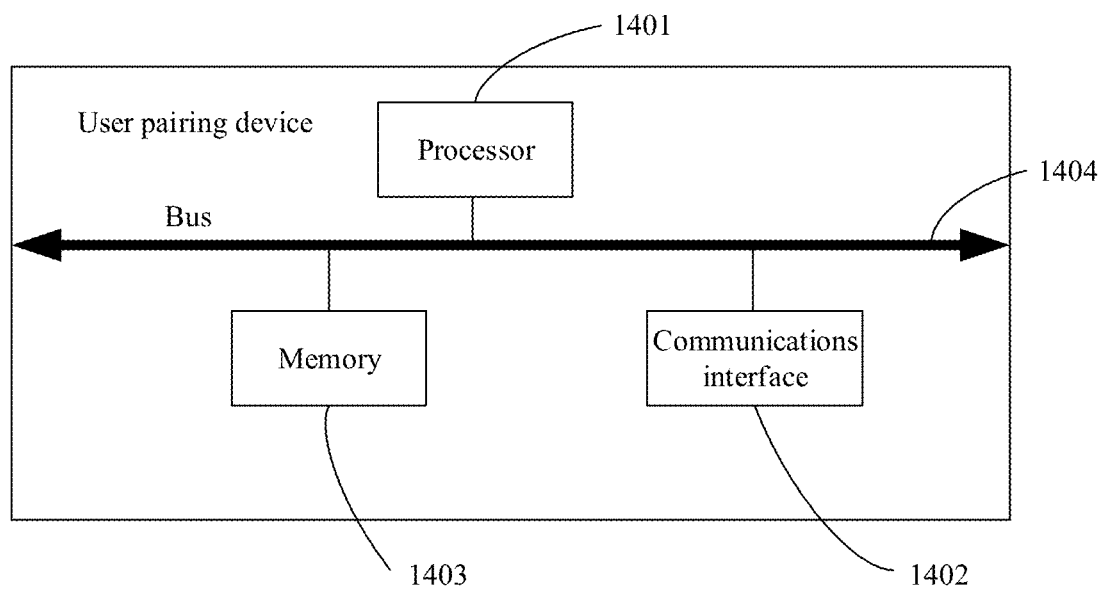
FIG. 14 is a schematic structural diagram of a user pairing device according to an embodiment of this application.

FIG. 14 is a schematic structural diagram of user pairing device according to an embodiment of this application. As shown in the figure, the user pairing device may include: at least one processor 1401, at least one communications interface 1402, at least one memory 1403, and at least one communications bus 1404. Certainly, in some implementations, the processor and the memory may be further integrated.

The processor 1401 may be a central processing unit, a general purpose processor, a digital signal processor, an application-specific integrated circuit, a field programmable gate array or another programmable logic device, a transistor logic device, a hardware component, or any combination thereof. The processor may implement or execute various examples of logical blocks, modules, and circuits that are described with reference to content disclosed in this application. Alternatively, the processor may be a combination of processors implementing a computing function, for example, a combination of one or more microprocessors, or a combination of a digital signal processor and a microprocessor. The communications bus 1404 may be a peripheral component interconnect PCI bus, an extended industry standard architecture EISA bus, or the like. The bus may be classified into an address bus, a data bus, a control bus, and the like. For ease of indication, the bus is indicated by using only one bold line in FIG. 14. However, it does not indicate that there is only one bus or only one type of bus. The communications bus 1404 is configured to implement connection and communication between the components. The communications interface 1402 of the device in this embodiment of this application is configured to communicate with another network element. The memory 1403 may include a volatile memory such as a nonvolatile random access memory (NVRAM), a phase change random access memory (PRAM), or a magnetoresistive random access memory (MRAM), or may include a nonvolatile memory such as at least one magnetic disk storage device, an electrically erasable programmable read-only memory (EEPROM), a flash memory device such as a NOR flash memory or a NAND flash memory, a semiconductor such as a solid state disk (SSD), or the like. Optionally, the memory 1403 may be at least one storage apparatus far away from the processor 1401. The memory 1403 stores a group of program code, and optionally, the processor 1401 may further execute the program stored in the memory 1403 for:

determining a first generation parameter of a first base sequence of a first user and a second generation parameter of a second base sequence of a second user, where the first base sequence is used to generate a first uplink reference signal of the first user, and the second base sequence is used to generate a second uplink reference signal of the second user;

determining multiplexing evaluation information of the first base sequence and the second base sequence based on the first generation parameter and the second generation parameter, where the multiplexing evaluation information includes at least one of correlation strength between the first base sequence and the second base sequence, and interference leakage information between a first power delay profile of a channel response corresponding to the first uplink reference signal and a second power delay profile of a channel response corresponding to the second uplink reference signal;

determining, based on the multiplexing evaluation information, whether the first user and the second user are successfully paired; and determining, when the first user and the second user are successfully paired, that the first user and the second user multiplex a same communication resource for communication.

Optionally, the processor 1401 is further configured to perform the following operation:

determining, when the correlation strength is greater than a first preset threshold, that the first user and the second user are successfully paired.

Optionally, the processor 1401 is further configured to perform the following operations:

determining an offset of a start location of a resource block occupied by the first user relative to a start location of a resource block occupied by the second user; and generating the first uplink reference signal based on the offset and the first base sequence, where the first uplink reference signal is used to estimate an uplink channel of the first user when the first user and the second user multiplex the same communication resource for communication.

Optionally, the processor 1401 is further configured to perform the following operation:

performing, when the offset is zero, a cyclic shift on the first base sequence based on a preset standard cyclic shift value to obtain the first uplink reference signal.

Optionally, the processor 1401 is further configured to perform the following operations:

determining, when the offset is not zero, a cyclic shift compensation value corresponding to the offset; and performing a cyclic shift on the first base sequence based on a preset standard cyclic shift value and the cyclic shift compensation value to obtain the first uplink reference signal.

Optionally, the processor 1401 is further configured to perform the following operations:

determining a basis kernel coefficient between the first base sequence and the second base sequence based on the first generation parameter and the second generation parameter, where the correlation strength is in a negative correlation to the basis kernel coefficient; and determining, when the basis kernel coefficient is less than a second preset threshold, that the first user and the second user are successfully paired.

Optionally, the interference leakage information includes an interference leakage width between the second power delay profile and the first power delay profile; and the processor 1401 is further configured to perform the following operations:

obtaining a quantity of first user multiplexing layers corresponding to the first user, a quantity of second user multiplexing layers corresponding to the second user, and a multipath delay guard interval of a communications system in which the first user and the second user are located;

determining an interference leakage threshold between the first user and the second user based on the quantity of first user multiplexing layers, the quantity of second user multiplexing layers, and the multipath delay guard interval; and determining, when the interference leakage width is not greater than the interference leakage threshold, that the first user and the second user are successfully paired.

Optionally, the processor 1401 is further configured to perform the following operations:

determining a cyclic shift guard interval between the first base sequence and the second base sequence;

determining a first cyclic shift value of the second base sequence based on the quantity of second user multiplexing layers and the cyclic shift guard interval; and performing a cyclic shift on the second base sequence based on the first cyclic shift value to obtain the second uplink reference signal, where the second uplink reference signal is used to estimate an uplink channel of the second user when the first user and the second user multiplex the same communication resource for communication.

Optionally, the processor 1401 is further configured to perform the following operations:

determining M first candidate cyclic shift values based on the quantity of second user multiplexing layers;

determining, based on the cyclic shift guard interval, M candidate central locations of the second power delay profile that correspond to the M first candidate cyclic shift values; and using, as a target central location, a candidate central location closest to a target location in the M candidate central locations, and using a first candidate cyclic shift value corresponding to the target central location as the first cyclic shift value.

Optionally, the processor 1401 is further configured to perform the following operations:

determining N candidate start locations of the first power delay profile that correspond to N second candidate cyclic shift values in a preset cyclic shift value set;

using, as a second cyclic shift value, a second candidate cyclic shift value corresponding to a candidate start location furthest from the target central location in the N candidate start locations; and performing a cyclic shift on the first base sequence based on the second cyclic shift value, to obtain the first uplink reference signal.

Optionally, the first generation parameter includes a size of a resource block occupied by the first user; and the processor 1401 is further configured to perform the following operations:

determining, when the interference leakage width is greater than the interference leakage threshold, that pairing between the first user and the second user fails; or adjusting, when the interference leakage width is greater than the interference leakage threshold, the size of the resource block; and determining, based on the adjusted size of the resource block, whether the first user and the second user are successfully paired.

Further, the processor may cooperate with the memory and a transceiver, to perform operations of the user pairing apparatus in the foregoing embodiments of this application.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable base stations. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, and microwave) manner. The computer-readable storage medium may be any available medium accessible to a computer, or a data storage device, for example, a server or a data center, integrating one or more available media. The available medium may be a magnetic medium (for example, a floppy disk, a hard disk, or a magnetic tape), an optical medium (for example, a DVD), a semiconductor medium (for example, a SSD), or the like.

The objectives, technical solutions, and beneficial effects of this application have been described in further detail with reference to the specific implementations. Any modification, equivalent replacement, or improvement made without departing from the spirit and principle of this application shall fall within the protection scope of this application.

What is claimed is:

1. A user pairing method, comprising:
   determining a first generation parameter of a first base sequence of a first user and a second generation parameter of a second base sequence of a second user, wherein the first base sequence is used to generate a first uplink reference signal of the first user, and the second base sequence is used to generate a second uplink reference signal of the second user;
   determining multiplexing evaluation information of the first base sequence and the second base sequence based on the first generation parameter and the second generation parameter, wherein the multiplexing evaluation information comprises at least one of: correlation strength between the first base sequence and the second base sequence, and interference leakage information between a first power delay profile of a channel response corresponding to the first uplink reference signal and a second power delay profile of a channel response corresponding to the second uplink reference signal;
   determining, based on the multiplexing evaluation information, that the first user and the second user are successfully paired; and
   determining that the first user and the second user multiplex a same communication resource for communication based on being successfully paired,
   wherein after the determining that the first user and the second user multiplex a same communication resource for communication, the method further comprises:
   determining a cyclic shift guard interval between the first base sequence and the second base sequence;
   determining a first cyclic shift value of the second base sequence based on the quantity of second user multiplexing layers and the cyclic shift guard interval; and
   performing a cyclic shift on the second base sequence based on the first cyclic shift value to obtain the second uplink reference signal, wherein the second uplink reference signal is used to estimate an uplink channel of the second user when the first user and the second user multiplex the same communication resource for communication.

2. The method according to claim 1, wherein the determining, based on the multiplexing evaluation information, that the first user and the second user are successfully paired comprises:
   determining that the first user and the second user are successfully paired responsive to determining that the correlation strength is greater than a first preset threshold.

3. The method according to claim 1, wherein after the determining that the first user and the second user multiplex the same communication resource for communication, the method further comprises:
   determining an offset of a start location of a resource block occupied by the first user relative to a start location of a resource block occupied by the second user; and
   generating the first uplink reference signal based on the offset and the first base sequence, wherein the first uplink reference signal is used to estimate an uplink channel of the first user.

4. The method according to claim 3, wherein the generating the first uplink reference signal based on the offset and the first base sequence comprises:
   performing, responsive to determining that the offset is zero, a cyclic shift on the first base sequence based on a preset standard cyclic shift value to obtain the first uplink reference signal.

5. The method according to claim 3, wherein the generating the first uplink reference signal based on the offset and the first base sequence comprises:
   determining, responsive to determining that the offset is not zero, a cyclic shift compensation value corresponding to the offset; and
   performing a cyclic shift on the first base sequence based on a preset standard cyclic shift value and the cyclic shift compensation value to obtain the first uplink reference signal.

6. The method according to claim 1, wherein the method further comprises:
   determining a basis kernel coefficient between the first base sequence and the second base sequence based on the first generation parameter and the second generation parameter, wherein the basis kernel coefficient is in a negative correlation to the correlation strength; and
   determining, responsive to determining that the basis kernel coefficient is less than a second preset threshold, that the first user and the second user are successfully paired.

7. The method according to claim 1, wherein the interference leakage information comprises an interference leakage width between the second power delay profile and the first power delay profile; and
   the determining, based on the multiplexing evaluation information, that the first user and the second user are successfully paired comprises:
   obtaining a quantity of first user multiplexing layers corresponding to the first user, a quantity of second user multiplexing layers corresponding to the second user, and a multipath delay guard interval of a communications system in which the first user and the second user are located;
   determining an interference leakage threshold between the first user and the second user based on the quantity of first user multiplexing layers, the quantity of second user multiplexing layers, and the multipath delay guard interval; and
   determining, responsive to determining that the interference leakage width is not greater than the interference leakage threshold, that the first user and the second user are successfully paired.

8. The method according to claim 7, wherein the first generation parameter comprises a size of a resource block occupied by the first user; and
   after the determining the interference leakage threshold between the first user and the second user based on the quantity of first user multiplexing layers, the quantity of second user multiplexing layers, and the multipath delay guard interval, the method further comprises:
   determining, responsive to determining that the interference leakage width is greater than the interference leakage threshold, that pairing between the first user and the second user fails; or adjusting, responsive to determining that the interference leakage width is greater than the interference leakage threshold, the size of the resource block; and determining, based on the adjusted size of the resource block, that the first user and the second user are successfully paired.

9. The method according to claim 1, wherein the determining a first cyclic shift value of the second base sequence based on the quantity of second user multiplexing layers and the cyclic shift guard interval comprises:

determining M first candidate cyclic shift values based on the quantity of second user multiplexing layers;

determining, based on the cyclic shift guard interval, M candidate central locations of the second power delay profile that correspond to the M first candidate cyclic shift values; and selecting a candidate central location closest to a target location in the M candidate central locations as a target central location, and selecting a first candidate cyclic shift value corresponding to the target central location as the first cyclic shift value.

10. The method according to claim 9, wherein after the determining the first cyclic shift value of the second base sequence based on the quantity of second user multiplexing layers and the cyclic shift guard interval, the method further comprises:

determining N candidate start locations of the first power delay profile that correspond to N second candidate cyclic shift values in a preset cyclic shift value set;

selecting a second candidate cyclic shift value corresponding to a candidate start location furthest from the target central location in the N candidate start locations as a second cyclic shift value; and performing a cyclic shift on the first base sequence based on the second cyclic shift value, to obtain the first uplink reference signal.

11. A user pairing apparatus, wherein the apparatus comprises:

one or more processors;

a non-transitory memory coupled to the one or more processors, wherein the non-transitory memory stores a program to be executed by the one or more processors, the program including instructions for:

determining a first generation parameter of a first base sequence of a first user and a second generation parameter of a second base sequence of a second user, wherein the first base sequence is used to generate a first uplink reference signal of the first user, and the second base sequence is used to generate a second uplink reference signal of the second user;

determining multiplexing evaluation information of the first base sequence and the second base sequence based on the first generation parameter and the second generation parameter, wherein the multiplexing evaluation information comprises at least one of correlation strength between the first base sequence and the second base sequence, and interference leakage information between a first power delay profile of a channel response corresponding to the first uplink reference signal and a second power delay profile of a channel response corresponding to the second uplink reference signal;

determining, based on the multiplexing evaluation information, that the first user and the second user are successfully paired; and determining that the first user and the second user multiplex a same communication resource for communication based on being successfully paired, wherein after the determining that the first user and the second user multiplex a same communication resource for communication, the method further comprises:

determining a cyclic shift guard interval between the first base sequence and the second base sequence;

determining a first cyclic shift value of the second base sequence based on the quantity of second user multiplexing layers and the cyclic shift guard interval; and performing a cyclic shift on the second base sequence based on the first cyclic shift value to obtain the second uplink reference signal, wherein the second uplink reference signal is used to estimate an uplink channel of the second user when the first user and the second user multiplex the same communication resource for communication.

12. The apparatus according to claim 11, wherein the program further includes instructions for:

determining, responsive to determining that the correlation strength is greater than a first preset threshold, that the first user and the second user are successfully paired.

13. The apparatus according to claim 11, wherein the program further includes instructions for:

determining an offset of a start location of a resource block occupied by the first user relative to a start location of a resource block occupied by the second user; and generating the first uplink reference signal based on the offset and the first base sequence, wherein the first uplink reference signal is used to estimate an uplink channel of the first user responsive to determining that the first user and the second user multiplex the same communication resource for communication.

14. The apparatus according to claim 13, wherein the program further includes instructions for:

performing, responsive to determining that the offset is zero, a cyclic shift on the first base sequence based on a preset standard cyclic shift value to obtain the first uplink reference signal.

15. The apparatus according to claim 13, wherein the program further includes instructions for:

determining, responsive to determining that the offset is not zero, a cyclic shift compensation value corresponding to the offset; and performing a cyclic shift on the first base sequence based on a preset standard cyclic shift value and the cyclic shift compensation value to obtain the first uplink reference signal.

16. The apparatus according to claim 11, wherein the program further includes instructions for:

determining a basis kernel coefficient between the first base sequence and the second base sequence based on the first generation parameter and the second generation parameter, wherein the basis kernel coefficient is in a negative correlation to the correlation strength; and determining, responsive to determining that the basis kernel coefficient is less than a second preset threshold, that the first user and the second user are successfully paired.

17. The apparatus according to claim 11, wherein the interference leakage information comprises an interference leakage width between the second power delay profile and the first power delay profile; and wherein the program further includes instructions for:

obtaining a quantity of first user multiplexing layers corresponding to the first user, a quantity of second user multiplexing layers corresponding to the second user, and a multipath delay guard interval of a communications system in which the first user and the second user are located; and determining an interference leakage threshold between the first user and the second user based on the quantity of first user multiplexing layers, the quantity of second user multiplexing layers, and the multipath delay guard interval; and determining, responsive to determining that the interference leakage width is not greater than the interference leakage threshold, that the first user and the second user are successfully paired.

18. A non-transitory computer readable medium, wherein the non-transitory computer readable medium stores instructions that are executable by a computer, and the instructions cause the computer to:

determine a first generation parameter of a first base sequence of a first user and a second generation parameter of a second base sequence of a second user, wherein the first base sequence is used to generate a first uplink reference signal of the first user, and the second base sequence is used to generate a second uplink reference signal of the second user;

determine multiplexing evaluation information of the first base sequence and the second base sequence based on the first generation parameter and the second generation parameter, wherein the multiplexing evaluation information comprises at least one of correlation strength between the first base sequence and the second base sequence, and interference leakage information between a first power delay profile of a channel response corresponding to the first uplink reference signal and a second power delay profile of a channel response corresponding to the second uplink reference signal;

determine, based on the multiplexing evaluation information, that the first user and the second user are successfully paired; and determine that the first user and the second user multiplex a same communication resource for communication based on being successfully paired, wherein after the determining that the first user and the second user multiplex a same communication resource for communication, the method further comprises:

determining a cyclic shift guard interval between the first base sequence and the second base sequence;

determining a first cyclic shift value of the second base sequence based on the quantity of second user multiplexing layers and the cyclic shift guard interval; and performing a cyclic shift on the second base sequence based on the first cyclic shift value to obtain the second uplink reference signal, wherein the second uplink reference signal is used to estimate an uplink channel of the second user when the first user and the second user multiplex the same communication resource for communication.

* * * * *